United States Patent
Kojima et al.

(10) Patent No.: US 6,772,740 B2
(45) Date of Patent: Aug. 10, 2004

(54) EVAPORATIVE FUEL TREATING DEVICE AND METHOD

(75) Inventors: Susumu Kojima, Susono (JP); Hidefumi Aikawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/401,577

(22) Filed: Mar. 31, 2003

(65) Prior Publication Data

US 2004/0000352 A1 Jan. 1, 2004

(30) Foreign Application Priority Data

Apr. 17, 2002 (JP) ........................................ 2002-115336

(51) Int. Cl.[7] .......................... F02M 33/00; B01D 53/22
(52) U.S. Cl. ..................................... 123/519; 123/520
(58) Field of Search ................................ 123/516, 518, 123/519, 520

(56) References Cited

U.S. PATENT DOCUMENTS

| | | | | |
|---|---|---|---|---|
| 5,957,113 A | * | 9/1999 | Masaki et al. .............. | 123/518 |
| 6,526,950 B2 | * | 3/2003 | Ito et al. ..................... | 123/518 |
| 2003/0121830 A1 | * | 7/2003 | Kuroyanagi et al. ........ | 208/348 |
| 2003/0196645 A1 | * | 10/2003 | Kojima et al. .............. | 123/520 |

FOREIGN PATENT DOCUMENTS

| | | |
|---|---|---|
| JP | A 62-279825 | 12/1987 |
| JP | A 63-270524 | 11/1988 |
| JP | A 4-290518 | 10/1992 |
| JP | A 6-147037 | 5/1994 |
| JP | A 10-274106 | 10/1998 |

* cited by examiner

Primary Examiner—Thomas N. Moulis
(74) Attorney, Agent, or Firm—Oliff & Berridge PLC

(57) ABSTRACT

A canister adsorbs evaporative fuel generated in a fuel tank. A purge gas circulation pump causes canister outlet gas to flow out from the canister. A high-concentration separation unit separates canister outlet gas into high-concentration treating gas and medium-concentration gas. A medium-concentration separation unit separates medium-concentration gas flowing out from the high-concentration unit into medium-concentration circulating gas and low-concentration canister inlet gas. Treating gas is introduced into the fuel tank. Circulating gas is caused to circulate upstream of the purge gas circulation pump. Canister inlet gas is caused to circulate upstream of the canister.

56 Claims, 20 Drawing Sheets

EVAPORATIVE FUEL TREATING DEVICE AND METHOD

INCORPORATION BY REFERENCE

The disclosure of Japanese Patent Application No. 2002-115336 filed on Apr. 17, 2002, including its specification, drawings, and abstract, is incorporated herein by reference in its entirety.

BACKGROUND OF THE INVENTION

1. Field of Invention

The invention relates to an evaporative fuel treating device and method, and more particularly, to an evaporative fuel treating device and method for treating evaporative fuel generated in a fuel tank of an internal combustion engine without discharging it into the atmosphere.

2. Description of Related Art

According to the art related to the invention, an evaporative fuel treating device having a canister for adsorbing evaporative fuel generated in a fuel tank is known as disclosed, for example, in Japanese Patent Application Laid-Open No. 10-274106. This device has a mechanism that purges evaporative fuel adsorbed in the canister through the flow of air and a separating membrane that separates evaporative fuel from purge gas. Furthermore, this device has a condensing unit for liquefying evaporative fuel separated by the separating membrane and a recirculation path for recirculating the condensed fuel back into the fuel tank. The evaporative fuel treating device thus constructed allows evaporative fuel generated in the fuel tank to be treated in a closed system including the canister. Thus, the above-mentioned device of the related art makes it possible to effectively prevent evaporative fuel from being discharged into the atmosphere without necessitating complicated control such as correction of fuel injection amount.

As described already, the above-mentioned device of the related art extracts evaporative fuel from purge gas by means of a separating membrane. However, the currently available separating membrane does not allow evaporative fuel having a sufficiently high concentration to be taken out from purge gas purged from the canister. If fuel gas having a low concentration is directly recirculated into the fuel tank, various inconveniences are caused due to the influence of air contained in fuel gas. Hence, the above-mentioned device of the related art is designed such that the condensing unit for condensing fuel gas is disposed in a post stage of the separating membrane.

As described hitherto, the above-mentioned device of the related art cannot produce high-concentration fuel gas by means of the separating membrane and thus requires that the condensing unit be disposed in the post stage of the separating membrane.

SUMMARY OF THE INVENTION

It is one object of the invention to provide an evaporative fuel treating device that can sufficiently condense evaporative fuel only through a treatment by separating membranes and that makes recirculation of evaporative fuel to a fuel tank possible without employing a condensing unit.

An evaporative fuel treating device for an internal combustion engine in accordance with a first aspect of the invention comprises a canister that adsorbs evaporative fuel generated in a fuel tank and a purge pump that causes canister outlet gas to flow out from the canister. In addition, a separating unit separates the canister outlet gas into treating gas containing a high concentration of evaporative fuel, circulating gas containing a medium concentration of evaporative fuel, and canister inlet gas containing a low concentration of evaporative fuel. A treating gas passage introduces the treating gas from the separating unit into the fuel tank. A circulating gas passage causes the circulating gas to circulate from the separating unit to a location upstream of the separating unit. A canister inlet gas passage causes the canister inlet gas to circulate from the separating unit to a location upstream of the canister.

According to the above-mentioned first aspect, canister outlet gas purged from the canister can be separated into high-concentration treating gas, medium-concentration circulating gas, and low-concentration canister inlet gas by being treated by the separating unit. In this case, medium-concentration circulating gas is circulated back through the separating unit and is repeatedly subjected to a concentrating processing. Thus, the first aspect makes it possible to make the concentration of treating gas sufficiently high and the concentration of canister inlet gas sufficiently low. Treating gas having a sufficiently high concentration can be utilized as fuel by being introduced into the fuel tank. Canister inlet gas having a sufficiently low concentration can be utilized as gas for purging evaporative fuel adsorbed in the canister by being introduced into the canister. Thus, the first aspect makes it possible to ensure that evaporative fuel adsorbed in the canister can be efficiently utilized as fuel.

In the above-mentioned first aspect, it is preferable that the purge pump include a purge gas circulation pump that communicates with the canister, that the separating unit include a high-concentration separation unit and a medium-concentration separation unit. It is preferable that the high-concentration separation unit have a first separating membrane for separating gas containing evaporative fuel into high-concentration gas containing a high concentration of evaporative fuel and low-concentration gas containing a low concentration of evaporative fuel and separate mixed gas composed of the canister outlet gas and the circulating gas into the treating gas and medium-concentration gas. It also is preferable that the medium-concentration separation unit be disposed downstream of the high-concentration separation unit, have a second separating membrane functioning in the same manner as the first separating membrane, and separate the medium-concentration gas into the circulating gas and the canister inlet gas. In this construction, canister outlet gas can be produced by the purge gas circulation pump. Further, high-concentration treating gas, medium-concentration circulating gas, and low-concentration canister inlet gas can be produced from canister outlet gas by using the high-concentration separation unit and the medium-concentration separation unit.

In the above-mentioned aspect, it is preferable that an area of the first separating membrane be smaller than an area of the second separating membrane. In this construction, it becomes possible to efficiently take out high-concentration treating gas during treatment of mixed gas by the first separating membrane and to efficiently take out low-concentration canister inlet gas during treatment of medium-concentration gas by the second separating membrane, by making the area of the first separating membrane included in the high-concentration separation unit smaller than the area of the second separating membrane included in the medium-concentration separation unit.

In the above-mentioned aspect, it is preferable that a ratio between the area of the first separating membrane and the area of the second separating membrane be set such that the treating gas and the canister inlet gas contain evaporative fuel having a concentration equal to or higher than 95% and evaporative fuel having a concentration equal to or lower than 5% respectively in the case where canister outlet gas contains evaporative fuel having a concentration of 15%. In this construction, since the ratio between the area of the first separating membrane and the area of the second separating membrane assumes a suitable value, the concentration of evaporative fuel contained in treating gas and the concentration of evaporative fuel contained in canister inlet gas can be made equal to or higher than 95% and equal to or lower than 5% respectively if the concentration of evaporative fuel contained in canister outlet gas is equal to or higher than 15%. Hence, a processing of liquefying evaporative fuel in the canister can be continued until the concentration of canister outlet gas reaches 15%.

In the above-mentioned aspect, it is preferable that the evaporative fuel treating device further comprise a feed pump that feeds fuel in the fuel tank to the internal combustion engine, and that the treating gas passage introduce the treating gas into a fuel suction port of the feed pump. In this construction, treating gas can be introduced into the fuel suction port of the feed pump. Treating gas sucked into the feed pump is liquefied by being compressed therein. Thus, this aspect of the invention makes it possible to ensure that treating gas can be utilized as fuel without providing a special mechanism for liquefying treating gas.

In the above-mentioned aspect, it is preferable that the evaporative fuel treating device further comprise a venturi for generating a negative pressure at the fuel suction port of the feed pump. In this construction, treating gas can be smoothly sucked into the feed pump by providing the venturi at the fuel suction port of the feed pump.

In the above-mentioned aspect, it is preferable that the purge gas circulating pump be disposed between the canister and the high-concentration separation unit, and that the canister inlet gas passage be provided with a pressure-regulating valve that makes a pressure on the side of the medium-concentration separation unit higher than a pressure on the side of the canister. In this construction, the purge gas circulation pump is disposed between the canister and the high-concentration separation unit, and the pressure-regulating valve is disposed between the medium-concentration separation unit and the canister. A set pressure of the pressure-regulating valve is applied between the purge gas circulation pump and the pressure-regulating valve. The separating performances of the high-concentration separation unit and the medium-concentration separation unit are improved as pressures applied thereto are increased. Hence, they can exert excellent performances of treating evaporative fuel. The amount of canister inlet gas increases in proportion to a decrease in concentration of canister outlet gas, a decrease in amount of treating gas, and a decrease in amount of circulating gas. Hence, the smaller the amount of evaporative fuel in the canister becomes, the easier it becomes to create a state where the evaporative fuel is likely to be purged.

In the above-mentioned aspect, it is preferable that the evaporative fuel treating device be capable of making a treating performance at the time when the separating unit produces the treating gas variable, and that a controller of the device calculates a required amount of fuel to be treated, and controls the device on the basis of the required treatment amount. In this construction, the treating performance of the separating unit can be changed in accordance with a required amount of evaporative fuel to be treated. Thus, a suitable process of treating evaporative fuel can be performed in accordance with a state of the internal combustion engine.

In the above-mentioned aspect, the device can make a pressure of the mixed gas coming into contact with the first separating membrane and a pressure of the medium-concentration gas coming into contact with the second separating membrane variable, and the controller can increase the pressure in proportion to an increase in the required treatment amount. In this construction, a desired performance of treatment can be realized by changing the pressure of mixed gas coming into contact with the first separating membrane or the pressure of medium-concentration gas coming into contact with the second separating membrane.

In the above-mentioned aspect, a variable pressure-regulating valve can be used to make the pressure variable, and the controller increases the set pressure in proportion to an increase in the required treatment amount by adjusting the variable pressure-regulating valve. In this construction, a desired pressure can be created by changing the set pressure of the pressure-regulating valve.

In the above-mentioned aspect, the pressure can be varied by making a discharging performance of the purge gas circulation pump variable, and the controller increases the discharging performance of the purge gas recirculation pump in proportion to an increase in the required treatment amount. In this construction, a desired performance of treatment can be created by changing the discharging performance of the purge gas circulation pump.

In the above-mentioned aspect, the performance can be varied by using a canister heater that heats the canister. The controller increases an amount of heat to be generated by the canister heater in proportion to an increase in the required treatment amount. In this construction, a desired performance of treatment can be created by changing the degree to which the canister is heated.

In the above-mentioned aspect, the evaporative fuel treating device can include a negative pressure adjusting valve that is disposed between the canister and the purge gas circulation pump and that generates a negative pressure in the circulating gas passage during operation of the purge gas circulation pump. In this construction, a negative pressure can be generated in the circulating gas passage by disposing the negative pressure adjusting valve between the canister and the purge gas circulation pump. The negative pressure generated in the circulating gas passage is applied to the second separating membrane and increases a differential pressure that is applied across the second separating membrane. Thus, this aspect of the invention makes it possible to generate a high differential pressure without applying an excessively high positive pressure to the second separating membrane, and to cause the medium-concentration separation unit to exert an excellent performance of concentration.

In the above-mentioned aspect, it also is preferable that the evaporative fuel treating device further include desorption promoting means for promoting desorption of evaporative fuel from the canister. In this construction, since the desorption promoting means for promoting desorption of evaporative fuel from the canister is provided, evaporative fuel in the canister can be suitably purged despite the fact that evaporative fuel is contained in canister inlet gas.

In the above-mentioned aspect, the desorption promoting means can include a canister heater that heats the canister. In this construction, desorption of evaporative fuel can be effectively promoted by heating the canister.

In the above-mentioned aspect, it is possible that the canister and the purge gas circulation pump be disposed such that heat resulting from operation of the purge gas circulation pump is transmitted to the canister, and that the canister heater include the purge gas circulation pump. In this construction, the canister can be heated utilizing heat generated by the purge gas circulation pump. Alternatively, or in addition, a dedicated heater can be provided for the canister.

In the above-mentioned aspect, the evaporative fuel treating device can further comprise a concentration detector that detects at least one of a concentration of the canister outlet gas, a concentration of the mixed gas, and a concentration of the treating gas, and the controller determines, on the basis of a difference between a value detected by the concentration detector during operation of the desorption promoting means and a value detected by the concentration detector during stoppage of the desorption promoting means, whether or not the desorption promoting means is functioning abnormally. In this construction, it is possible to determine, by comparing a concentration indicating a state of desorption of evaporative fuel from the canister (a concentration of canister outlet gas or the like) during operation of the desorption promoting means with a concentration indicating a state of desorption of evaporative fuel from the canister (a concentration of canister outlet gas or the like) during stoppage of the desorption promoting means, whether or not the desorption promoting means is functioning properly, namely, whether or not there is an abnormality occurring in the desorption promoting means.

In the above-mentioned aspect, it is preferable that the high-concentration separation unit be disposed below the medium-concentration separation unit. In this construction, since the high-concentration separation unit is disposed below the medium-concentration separation unit, it is possible to efficiently ensure that high-concentration gas, which has a greater specific gravity, exists in the high-concentration separation unit. Thus, this aspect of the invention makes it possible to ensure a high performance of treatment.

In the above-mentioned aspect, it is preferable that the fuel tank be disposed below the high-concentration separation unit and the medium-concentration separation unit. In this construction, since the fuel tank is disposed below the high-concentration separation unit and the medium-concentration separation unit, fuel that has been liquefied in the units can be efficiently returned to the fuel tank.

In the above-mentioned aspect, it is preferable that the evaporative fuel treating device further includes a concentration detector that detects at least one of a concentration of the canister outlet gas, a concentration of the mixed gas, and a concentration of the treating gas, and that the ratio between an area of the first separating membrane and an area of the second separating membrane be variable. It is preferable that the controller controls the variable area ratio on the basis of a value detected by the concentration detector. In this construction, a suitable performance of treating evaporative fuel can be realized in accordance with a state of the canister by changing an area ratio between the first and second separating membranes in accordance with a concentration indicating a state of desorption of evaporative fuel from the canister (a concentration of canister outlet gas or the like).

In the above-mentioned aspect, it is preferable that the high-concentration separation unit be provided with a plurality of treating chambers, that the first separating membrane include a plurality of portions each of which separates a corresponding one of the treating chambers into a corresponding one of upper chambers and a corresponding one of lower chambers, that the treating chambers be arranged such that the upper chambers lead to one another in series and that all the lower chambers communicate with the treating gas passage. The variable area ratio can be varied by including at least two passages for introducing the mixed gas into at least two of the upper chambers respectively and a valve mechanism that makes a ratio between amounts of the mixed gas flowing through the at least two passages variable. The controller controls the valve mechanism on the basis of a value detected by the concentration detector. In this construction, the area ratio between the first and second separating membranes can be substantially changed by changing the amount of mixed gas flowing through the upper chambers included in the high-concentration separation unit or the like.

In the above-mentioned aspect, it is preferable that the evaporative fuel treating device further comprise a treating gas tank that communicates with the treating gas passage and that accumulates the treating gas and fuel gas supply that supplies the internal combustion engine with fuel, that is, the treating gas accumulated in the treating gas tank when the internal combustion engine is started. In this construction, startability of the internal combustion engine can be enhanced by utilizing treating gas accumulated in the treating gas tank as fuel when the internal combustion engine is started.

In the above-mentioned aspect, it is preferable that the evaporative fuel treating device further comprise a pump outlet pressure detector that detects a pressure applied to an outlet portion of the purge gas circulation pump, and the controller recognizes the occurrence of an abnormality in the purge gas circulation pump or in a path extending from the purge gas circulation pump to the pressure-regulating valve if the pressure that is applied to the outlet portion and that has been detected under circumstances requiring the purge gas circulation pump to be operated is unequal to a predetermined value. In this construction, in the case where the purge gas circulation pump is required to operate, it is possible to determine, depending on whether or not there is a suitable pressure at the outlet portion of the pump, whether or not the pump is operating properly and whether or not there is an abnormality in the path extending from the pump to the pressure-regulating valve.

In the above-mentioned aspect, it is preferable that the evaporative fuel treating device further comprise a pump outlet pressure detector that detects a pressure applied to the outlet portion of the purge gas circulation pump, and the controller determines, on the basis of a pressure change that occurs in the outlet portion immediately after operation of the purge gas circulation pump has been stopped, whether or not leakage has been caused in the path extending from the purge gas circulation pump to the pressure-regulating valve. In this construction, it is possible to determine, depending on whether or not the pressure at the outlet portion of the purge gas circulation pump suitably changes after stoppage thereof, whether or not leakage has been caused in the path extending from the pump to the pressure-regulating valve.

In the above-mentioned aspect, it also is preferable that the evaporative fuel treating device further comprise a canister flow gas detector that detects a flow rate of gas flowing through the canister, and the controller makes, on the basis of a flow rate of gas flowing through the canister, a determination on completion of operation of the purge pump. In this construction, it is possible to make a determination on completion of purge on the basis of a flow rate of gas flowing through the canister. The flow rate of gas increases as the flow rates of treating gas and circulating gas decrease in response to a decrease in amount of evaporative fuel in the canister. Thus, purge can be completed as soon as evaporative fuel in the canister is suitably treated.

BRIEF DESCRIPTION OF THE DRAWINGS

The invention will be described with reference to exemplary embodiments shown in the drawings, in which.

DETAILED DESCRIPTION OF PREFERRED EMBODIMENTS

Figure 1:
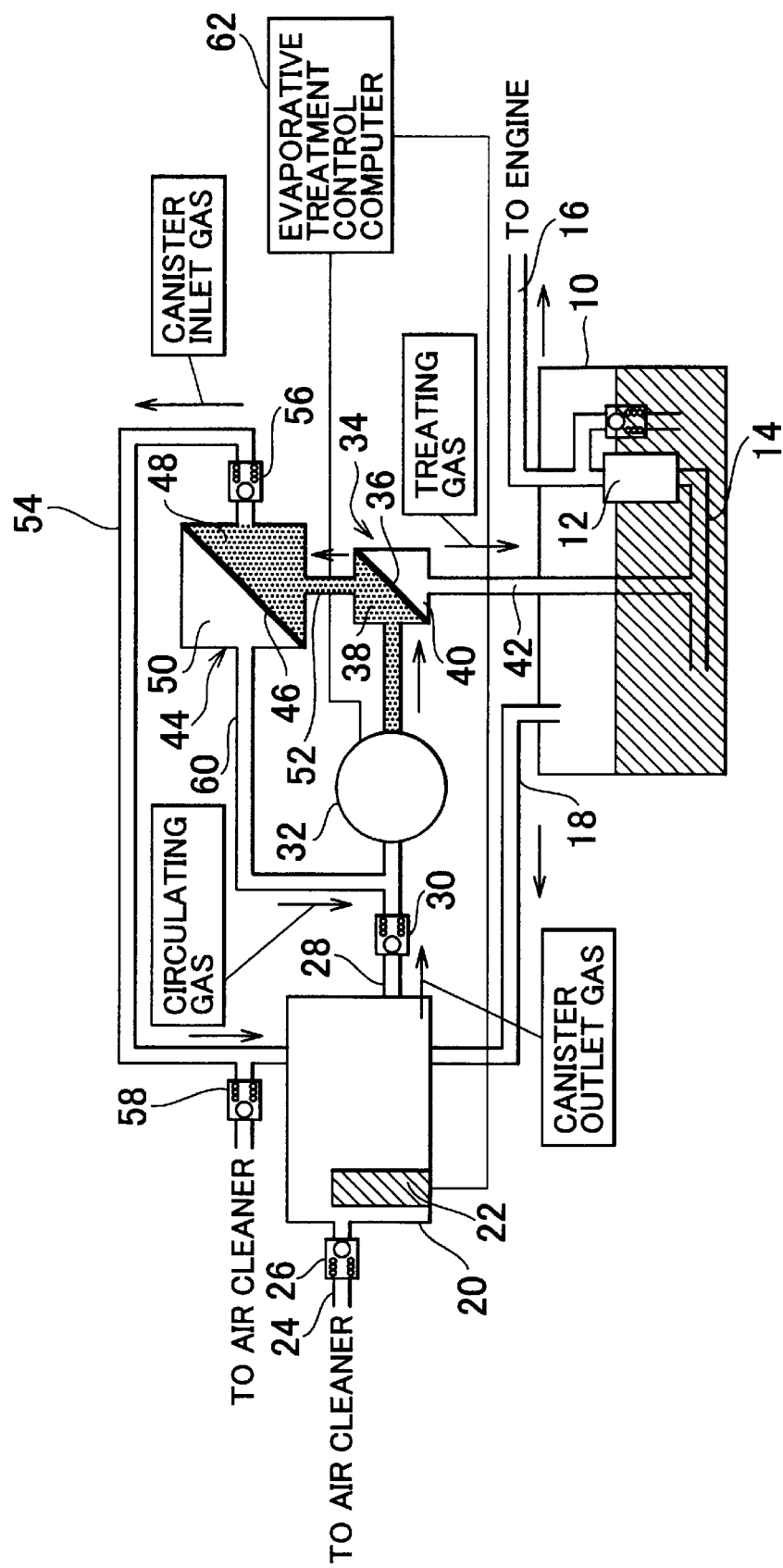
FIG. 1 is an explanatory view of the construction of an evaporative fuel treating device in accordance with a first embodiment of the invention.

Hereinafter, exemplary embodiments of the invention will be described with reference to the drawings. Like elements are denoted by like reference symbols in the drawings, and repetition of the same description will be avoided.

FIG. 1 is an explanatory view of the evaporative fuel treating device in accordance with a first embodiment of the invention.

As shown in FIG. 1, the device of the first embodiment has a fuel tank 10. A low-pressure feed pump 12 (hereinafter referred to simply as "the feed pump 12") is disposed inside the fuel tank 10. A suction pipe 14 for sucking fuel in the fuel tank 10 and a fuel pipe 16 for feeding fuel to an internal combustion engine (not shown) communicate with the feed pump 12.

A canister 20 communicates with the fuel tank 10 via a vapor passage 18. The canister 20 contains activated carbon. Evaporative fuel generated in the fuel tank 10 flows into the canister 20 through the vapor passage 18 and is adsorbed by the activated carbon.

A heater 22 is disposed inside the canister 20 together with the activated carbon. The heater 22 can suitably heat the activated carbon. The canister 20 also has an atmospheric port 24. An anti-overpressure valve 26 for preventing an overpressure from being generated inside the canister 20 is disposed in the atmospheric port 24. The anti-overpressure valve 26 is a one-way valve that allows fluid only to flow out from the inside of the canister 20, and is open to the atmosphere via an air cleaner (not shown).

A purge passage 28 communicates with the canister 20. The purge passage 28 has a negative pressure adjusting valve 30, and communicates with a suction port of a purge gas circulation pump 32 downstream of the adjusting valve 30. The negative pressure adjusting valve 30 is a one-way valve that allows fluid only to flow from the canister 20 toward the purge gas circulation pump 32, and is provided so as to generate a predetermined negative pressure in the vicinity of the suction port during operation of the purge gas circulation pump 32.

A high-concentration separation unit 34 communicates with a discharge port of the purge gas circulation pump 32. The high-concentration separation unit 34 has a first separating membrane 36 and upper and lower chambers 38, 40 that are separated by the first separating membrane 36. More specifically, the above-mentioned purge gas circulation pump 32 communicates with the upper chamber 38 of the high-concentration separation unit 34. On the other hand, a treating gas passage 42 communicates with the lower chamber 40 of the high-concentration separation unit 34. In the fuel tank 10, the treating gas passage 42 communicates with the suction pipe 14, that is, with a suction port of the feed pump 12. In a three-dimensional arrangement, the high-concentration separation unit 34 is disposed higher than the fuel tank 10. Hence, the treating gas passage 42 extends downward from above.

A medium-concentration separation unit 44 is disposed above the high-concentration separation unit 34. The medium-concentration separation unit 44 has a second separating membrane 46 and upper and lower chambers 48, 50 that are separated by the second separating membrane 46. The upper chamber 48 of the medium-concentration separation unit 44 communicates with the upper chamber 38 of the high-concentration separation unit 34 via a communication passage 52. In a three-dimensional arrangement, the medium-concentration separation unit 44 is disposed higher than the high-concentration separation unit 34. Hence, the communication passage 52 extends downward from above.

A canister inlet gas passage 54 further communicates with the upper chamber 48 of the medium-concentration separation unit 44. The canister inlet gas passage 54 communicates with the above-mentioned canister 20 and allows gas flowing out from the medium-concentration separation unit 44 to be recirculated into the canister 20. The canister inlet gas passage 54 has a pressure-regulating valve 56 and an anti-negative pressure valve 58. The pressure-regulating valve 56 is located close to an end portion of the canister inlet gas passage 54 on the side of the medium-concentration separation unit 44. The anti-negative pressure valve 58 is located close to an end portion of the canister inlet gas passage 54 on the side of the canister 20.

The pressure-regulating valve 56 is a one-way valve that allows fluid only to flow from the medium-concentration separation unit 44 toward the canister 20. The pressure-regulating valve 56 is provided so as to generate a predetermined positive pressure upstream thereof, more specifically, in a path extending from the purge gas circulation pump 32 to the pressure-regulating valve 56. On the other hand, the anti-negative pressure valve 58 communicates with the atmosphere via the air cleaner (not shown), and is a one-way valve that allows the atmosphere only to flow into the canister inlet gas passage 54. The anti-negative pressure valve 58 is provided so as to prevent an unduly high negative pressure from being generated in the canister inlet gas passage 54 or the canister 20.

A circulating gas passage 60 communicates with the lower chamber 50 of the medium-concentration separation unit 44. The circulating gas passage 60 communicates with the purge passage 28 downstream of the negative pressure adjusting valve 30. Accordingly, the circulating gas passage 60 can establish a state of conduction between the lower chamber 50 of the medium-concentration separation unit 44 and the suction port of the purge gas circulation pump 32.

As shown in FIG. 1, the device of the first embodiment has an evaporative treatment control computer (or controller) 62 (hereinafter referred to as an ECU (Electronic Control Unit)). The above-mentioned heater 22, the purge gas circulation pump 32, and the like are controlled by the ECU 62.

Next, characteristics of the first separating membrane 36 and the second separating membrane 46 will be described with reference to FIG. 2.

The first separating membrane 36 and the second separating membrane 46 are thin membranes made from a high-molecular material such as polyimide. The first separating membrane 36 and the second separating membrane 46 exhibit the characteristics of separating air and fuel contained in gas from each other upon exposure to the gas, making use of a difference between a solubility of air in the membranes and a solubility of fuel in the membranes.

Figure 2:
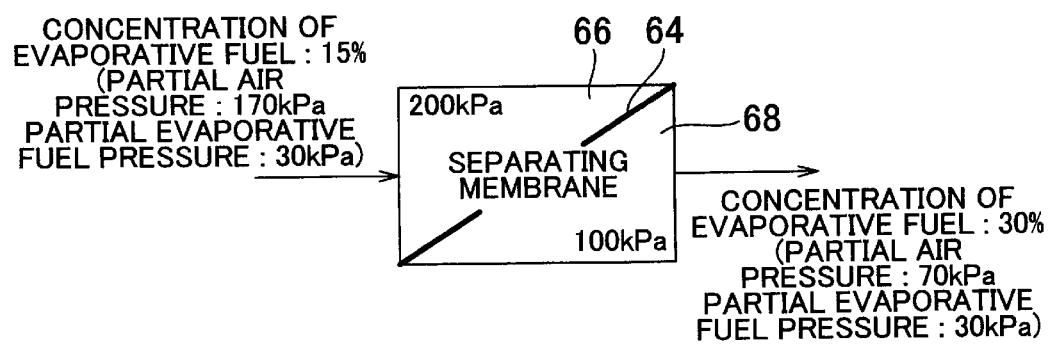
FIG. 2 is an explanatory view of the principle of a separating membrane included in the device of the first embodiment.

FIG. 2 schematically shows the principle on which a separating membrane 64 having the above-mentioned construction condenses evaporative fuel. More specifically, FIG. 2 shows a state where gas containing evaporative fuel having a concentration of 15% is introduced into an upstream space 66 (upper-left space) of the separating membrane 64 at a pressure of 30 kPa and where a pressure of 100 kPa is applied to a downstream space 68 (lower-right space) of the separating membrane 64.

Ideally, the separating membrane 64 allows free passage of evaporative fuel while preventing passage of air. In this case, evaporative fuel is at an equal partial vapor pressure across the separating membrane 64. In the state shown in FIG. 2, a partial air pressure of 170 kPa and a partial fuel pressure of 30 kPa are generated in the upper space 66 (200 kPa, 15%) of the separating membrane 64. If it is assumed that fuel is at an equal partial pressure across the separating membrane 64, a partial air pressure of 70 kPa and a partial fuel pressure of 30 kPa are generated in the downstream space 68. In this case, the concentration of evaporative fuel is increased from 15% to 30% due to the function of the separating membrane 64.

As described above, the separating membrane 64 employed in the first embodiment can increase a concentration of evaporative fuel contained in gas by introducing high-pressure gas to the upstream side of the separating membrane 64 and maintaining the downstream side of the separating membrane 64 at a low pressure. In this case, the performance of concentrating evaporative fuel improves in proportion to an increase in differential pressure generated across the separating membrane and in proportion to a decrease in pressure downstream of the separating membrane. Thus, the first separating membrane 36 and the second separating membrane 46 can improve the performance of concentrating evaporative fuel in proportion to an increase in pressure introduced into the upstream side thereof (the upper chambers 38, 48) and in proportion to a decrease in pressure introduced into the downstream side thereof (the lower chambers 40, 50), respectively.

Next, the principle on which gas containing fuel having a sufficiently high concentration and gas containing fuel having a sufficiently low concentration are taken out from mixed gas composed of evaporative fuel and air making use of the separating membranes will be described.

Figure 3A:
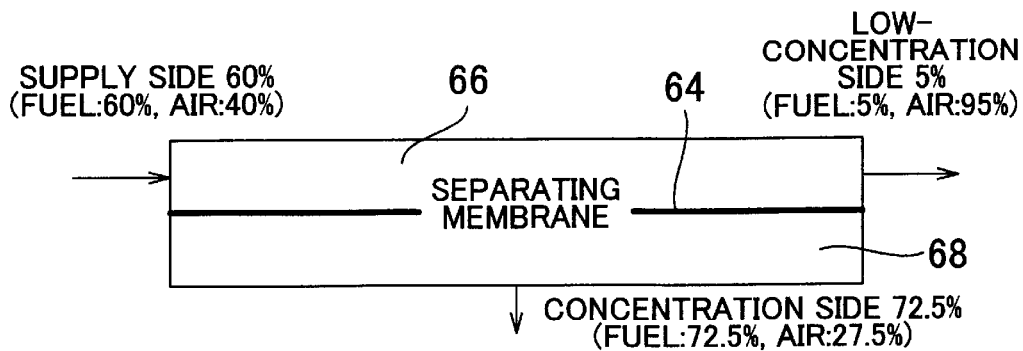
FIGS. 3A–3C are explanatory views of the principle on which the separating membrane included in the device of the first embodiment produces high-concentration gas and low-concentration gas.

FIG. 3A shows a state where evaporative fuel gas of 60% (fuel 60%, air 40%) flows into the upstream space 66 of the separating membrane 64 and where the separating membrane 64 separates the gas into low-concentration gas of 5% (fuel 5%, air 95%) and medium-concentration gas of 72.5% (fuel 72.5%, air 27.5%).

Figure 3B:
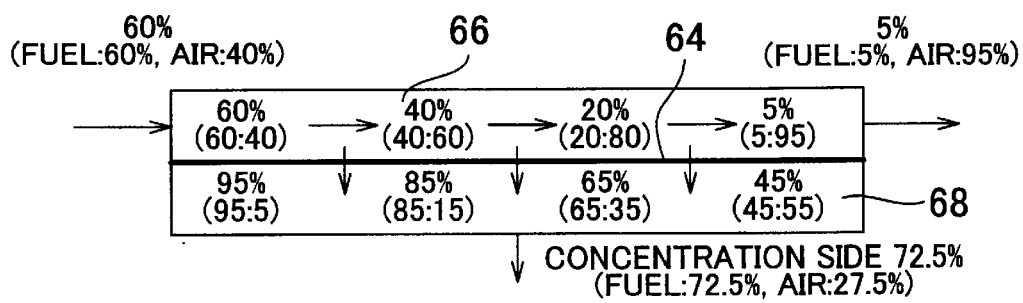

FIG. 3B shows in detail how separation shown in FIG. 3A occurs. As shown in FIG. 3B, upon flowing into the upstream space 66, evaporative fuel gas has a concentration of 60%. In a region where the concentration of evaporative fuel is thus high, evaporative fuel gas of an extremely high concentration can be produced downstream of the separating membrane 64. More specifically, gas containing fuel having a concentration of approximately 95% can be produced.

The concentration of evaporative fuel gas that has flowed into the upstream space 66 decreases as evaporative fuel contained in gas is separated and introduced into the downstream space 68. Hence, as shown in FIG. 3B, the concentration in the upstream space 66 decreases from the left to the right. In a stage where evaporative fuel gas flows out from the upstream space 66, the concentration thereof has decreased to approximately 5%. The concentration of concentrated gas produced in the downstream space 68 corresponds to the concentration of gas upstream of the separating membrane 64. Hence, as in the case of the concentration in the upstream space 66, the concentration of gas in the downstream space 68 decreases from the left to the right in FIGS. 3A and 3B.

Concentrated gas shown in FIG. 3A has a concentration of 72.5%, which is an average concentration of evaporative fuel gas produced in the downstream space 68. That is, as shown in FIG. 3B, the above-mentioned concentration of 72.5% is a fuel concentration in the case where concentrated gas that is produced in the downstream space 68 with a distribution of approximately 95 to 45% has been taken out at a time.

Figure 3C:
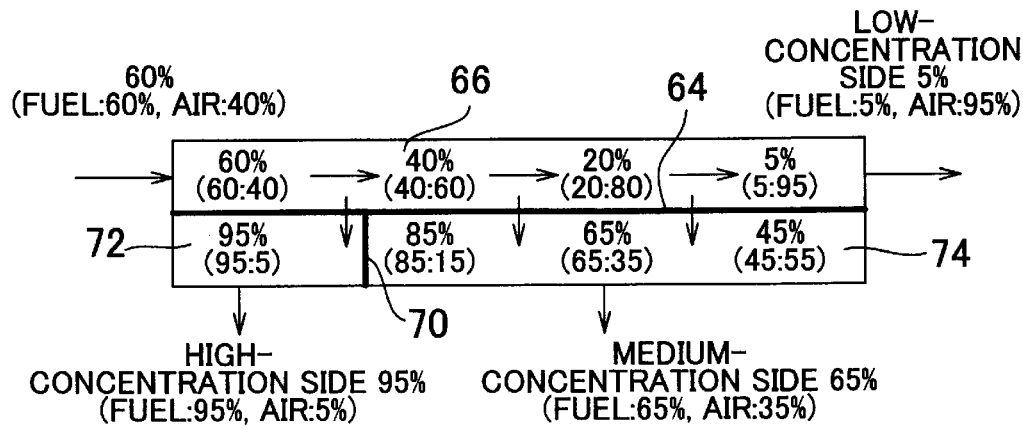

FIG. 3C shows a state where the downstream space 68 is separated into a high-concentration downstream space 72 and a medium-concentration downstream space 74 by a partition 70. In FIG. 3C, the partition 70 separates the downstream space 68 such that evaporative fuel produced in the high-concentration downstream space 72 has a concentration of 95%. In this case, evaporative fuel gas produced in the high-concentration downstream space 72 is high-concentration gas of 95%, whereas gas produced in the medium-concentration downstream space 74 is medium-concentration gas of 65%.

As described above, in the case where evaporative fuel gas of approximately 60% is turned into low-concentration (approximately 5%) gas by being treated by the separating membrane 64, if concentrated gas that is produced is taken out by being further separated into high-concentration gas and medium-concentration gas, evaporative fuel gas of an extremely high concentration (approximately 95%) can be produced. That is, in the case where evaporative fuel gas of a certain concentration is treated by the separating membrane 64, if medium-concentration gas is produced in addition to high-concentration gas and low-concentration gas, gas having a sufficiently high concentration (approximately 95%) and gas having a sufficiently low concentration (approximately 5%) can be produced.

Figure 4:
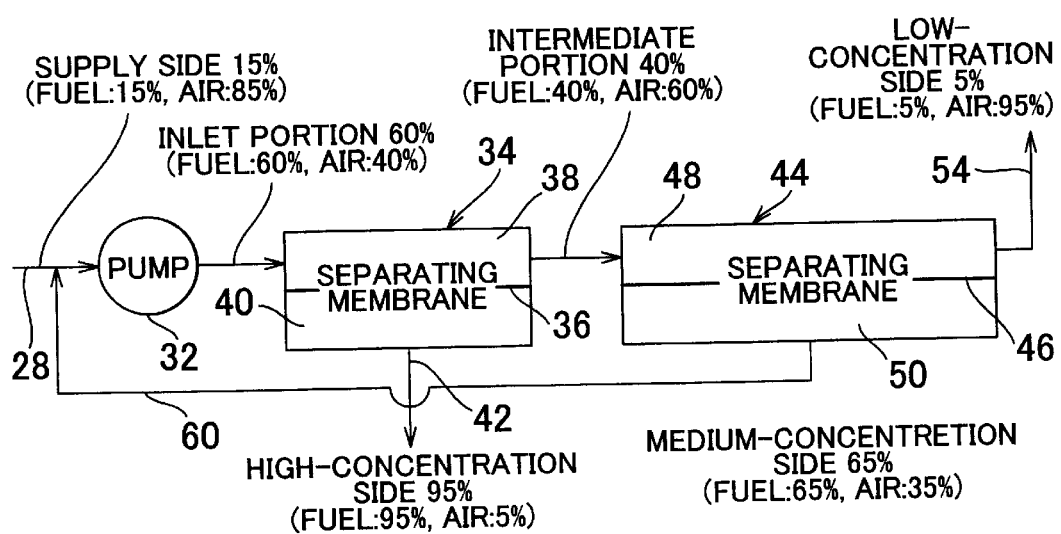
FIG. 4 is an explanatory view showing how the device of the first embodiment treats evaporative fuel.

FIG. 4 shows, in a simplified manner, a mechanism that is included in the device of the first embodiment so as to concentrate evaporative fuel.

FIG. 4 shows a state in which evaporative fuel gas of 15% is supplied to the purge passage 28 in the device of the first embodiment. In a steady state, the purge gas circulation pump 32 compresses mixed gas composed of evaporative fuel gas (canister outlet gas) supplied from the purge passage 28 and circulating gas supplied from the circulating gas passage 60, and supplies the mixed gas to the upper chamber 38 of the high-concentration separation unit 34.

Evaporative fuel gas that has flowed into the upper chamber 38 of the high-concentration separation unit 34 is treated therein and then flows into the upper chamber 48 of the medium-concentration separation unit 44. The evaporative fuel gas that has flowed into the upper chamber 48 of the medium-concentration separation unit 44 is treated therein and then flows into the canister inlet gas passage 54. In this case, the above-mentioned two upper chambers 38, 48 correspond to the upstream space 66 shown in FIG. 3C. The lower chamber 40 of the high-concentration separation unit 34 and the lower chamber 50 of the medium-concentration separation unit 44 correspond to the high-concentration downstream space 72 and the medium-concentration downstream space 74 shown in FIG. 3C, respectively.

Furthermore, in the device of the first embodiment, a ratio between an area of the first separating membrane 36 of the high-concentration separation unit 34 and an area of the second separating membrane 46 of the medium-concentration separation unit 44 corresponds to a ratio between an area of the high-concentration downstream space 72 and an area of the medium-concentration downstream space 74 shown in FIG. 3C, respectively. That is, in the first embodiment, a ratio between an area of the first separating membrane 36 and an area of the second separating membrane 46 is set such that gas of 95% and gas of 65% are produced in the lower chamber 40 of the high-concentration separation unit 34 and the lower chamber 50 of the medium-concentration separation unit 44 respectively in the case where evaporative fuel gas of 60% has flowed into the upper chamber 38 of the high-concentration separation unit 34.

In addition, the device of the first embodiment is designed such that a mixed gas composed of canister outlet gas of 15% and circulating gas has a fuel concentration of 60% in a steady state in the case where the canister output gas has been supplied to the purge passage 28. Hence, as shown in FIG. 4, according to the device of the first embodiment, if canister outlet gas supplied to the purge passage 28 has a concentration of 15%, it is possible to cause high-concentration gas of 95% to flow out from the high-concentration separation unit 34 to the treating gas passage 42, and to cause low-concentration gas of 5% to flow out from the medium-concentration separation unit 44 to the canister outlet gas passage 54.

Next, operation of the device of the first embodiment will be described with reference to FIGS. 5A, 5B and 6 as well as FIG. 1.

In the device of the first embodiment, the ECU 62 operates the purge gas circulation pump 32 if a predetermined purge condition is fulfilled. If the purge gas circulation pump 32 operates, a negative pressure generated on the side of the suction port thereof is introduced into the canister 20, and canister outlet gas flows out into the purge passage 28. Only if canister outlet gas has a fuel concentration equal to or higher than 15%, the ECU 62 determines that the purge condition has been fulfilled. Accordingly, the purge gas circulation pump 32 continues to operate only if canister outlet gas has a fuel concentration equal to or higher than 15%.

As described already, if canister outlet gas has a concentration of 15%, high-concentration treating gas having a fuel concentration of 95% is produced in the lower chamber 40 of the high-concentration separation unit 34. If canister outlet gas has a concentration higher than 15%, treating gas having a higher concentration is produced. The high-concentration treating gas thus produced is supplied to the suction port of the feed pump 12 in the fuel tank 10 through the treating gas passage 42.

In the first embodiment, the feed pump 12 is capable of pressurizing fuel to a pressure of approximately 300 kPa. If the treating gas sucked into the feed pump 12 is pressurized at such a pressure, it becomes liquid fuel. In this case, if a large amount of air is contained in the treating gas, inconveniences such as vapor lock of the feed pump 12 and generation of harmful noise are caused. On the other hand, if a small amount of air is contained in the treating gas, the air dissolves into fuel as the treating gas is pressurized. Therefore, the above-mentioned problems are not caused.

An air ratio that does not cause vapor lock or harmful noise is determined depending on the performance of the feed pump 12, that is, a fuel flow rate and a fuel pressure generated by the feed pump 12. In a feed pump generally installed in a vehicle, if the concentration of air contained in treating gas is lower than 5%, that is, if treating gas has a fuel concentration equal to or higher than 95%, the problems such as vapor lock and harmful noise are not caused. Thus, when combined with the feed pump 12 generally installed in a vehicle, the system of the first embodiment makes it possible to recirculate treating gas into the fuel tank 10 without causing the problems such as vapor lock and harmful noise.

As described above, the device of the first embodiment is designed such that treating gas always has a fuel concentration equal to or higher than 95%. A lower-limit value of the fuel concentration is determined from the standpoint of preventing vapor lock or generation of harmful noise. That is, the lower-limit value (95%) is determined in relation to the performance of the feed pump 12. If a feed pump that is higher in performance is employed, the lower-limit value of the fuel concentration of treating gas may be lower than 95%.

In the device of the first embodiment, if canister outlet gas having a concentration of 15% has been supplied to the purge passage 28, evaporative fuel gas having a concentration of approximately 40% flows into the upper chamber 48 of the medium-concentration separation unit 44 from the upper chamber 38 of the high-concentration separation unit 34 (see FIG. 4). If canister outlet gas has a concentration higher than 15%, gas having a concentration higher than 40% flows into the upper chamber 48 of the medium-concentration separation unit 44.

The medium-concentration separation unit 44 concentrates evaporative fuel thus flowing into the upper chamber 48, and generates medium-concentration circulating gas having a concentration of approximately 65% in the lower chamber 50. The medium-concentration circulating gas is recirculated to the side of the suction port of the purge gas circulation pump 32 through the circulating gas passage 60. As a result, the high-concentration separation unit 34 is always supplied with a mixed gas having a concentration equal to or higher than 60%. Thus, the device of the first embodiment makes it possible to stably produce treating gas having a concentration equal to or higher than 95% while the purge condition is fulfilled.

In the device of the first embodiment, evaporative fuel gas having a concentration equal to or higher than 40% flows into the upper chamber 48 of the medium-concentration separation unit 44, as described already. The evaporative fuel gas thus flowing into the upper chamber 48 decreases in concentration as it moves in the upper chamber 48. The concentration of the evaporative fuel gas soon converges to a low concentration of approximately 5%. The second separating membrane 46 included in the medium-concentration separation unit 44 always has an area that is sufficient to convert evaporative fuel gas having a concentration equal to or higher than 40% into low-concentration gas having a concentration of approximately 5%. Thus, the device of the first embodiment makes it possible to always maintain the concentration of canister inlet gas approximately equal to 5%.

Canister inlet gas flows into the canister 20 through the canister inlet gas passage 54, then flows through the inside of the canister 20, and flows out again to the purge passage 28. In the case where gas flows through the inside of the canister 20, if the concentration of evaporative fuel contained in the gas is sufficiently low, evaporative fuel adsorbed by activated carbon can be desorbed as the gas flows. In the device of the first embodiment, the fuel concentration of canister inlet gas is always held, as described already, equal to or lower than 5%. Thus, the device of the first embodiment makes it possible to utilize canister inlet gas as a gas for purging adsorbed fuel, and to efficiently treat evaporative fuel adsorbed by the canister 20 in a closed system.

Hereinafter, detailed contents that are set in the device of the first embodiment so as to realize the above-mentioned function of treating evaporative fuel will be described.

Figure 5A:
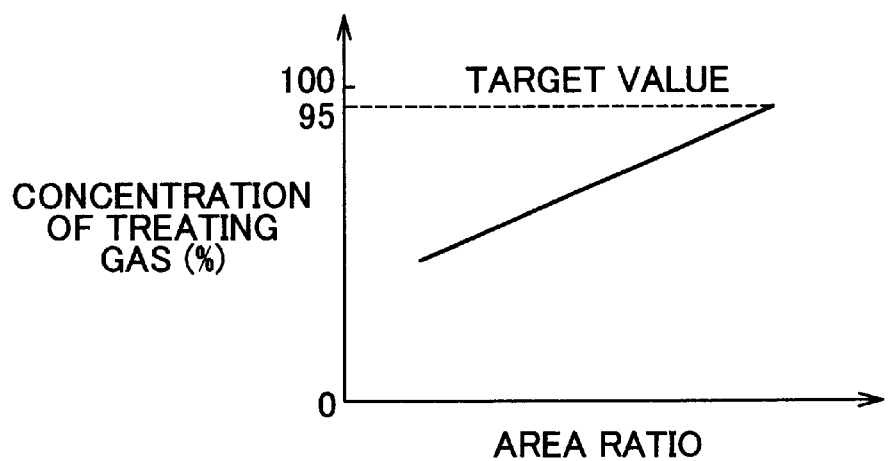
FIGS. 5A and 5B are graphs showing a relationship between area ratio between first and second separating membranes and concentration of treating gas or canister inlet gas.
Figure 5B:
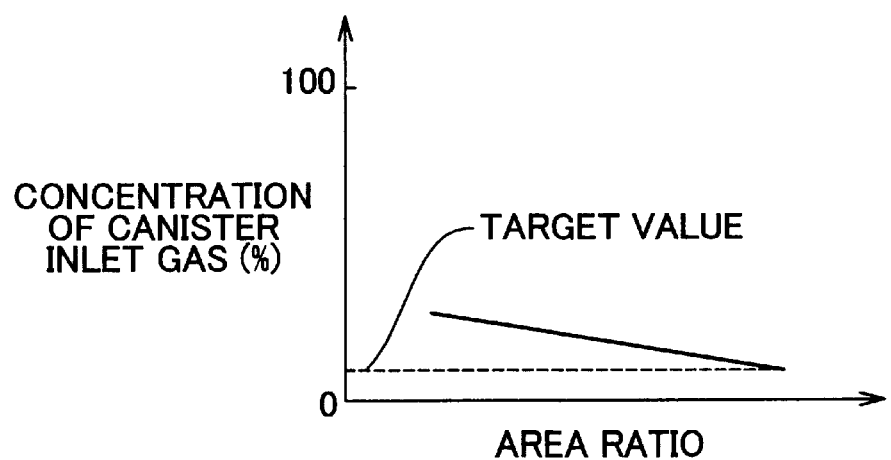

FIGS. 5A and 5B are explanatory views of the relationship between area ratio between the second separating membrane 46 and the first separating membrane 36 and concentration of evaporative fuel gas. More specifically, FIG. 5A shows a relationship between the above-mentioned area ratio and concentration of treating gas produced by the high-concentration separation unit 34. Further, FIG. 5B shows a relationship between the above-mentioned area ratio and concentration of canister inlet gas produced by the medium-concentration separation unit 44.

As shown in FIG. 5A, the concentration of treating gas increases in proportion to an increase in area ratio between the second separating membrane 46 and the first separating membrane 36. On the other hand, as shown in FIG. 5B, the concentration of canister inlet gas decreases in proportion to an increase in area ratio between the second separating membrane 46 and the first separating membrane 36. That is, as the second separating membrane 46 enlarges with respect to the first separating membrane 36, the concentration of treating gas increases and the concentration of canister inlet gas decreases.

If the concentration of canister outlet gas is 15% with a pressure of 150 kPa being applied to the first separating membrane 36, it is possible to achieve 95% as a target value (lower-limit value) of treating gas concentration and 5% as a target value (upper-limit value) of canister inlet gas concentration by setting the above-mentioned area ratio as 140:1. Thus, the device of the first embodiment is designed such that the area of the second separating membrane 46 is 140 or more times as large as the first separating membrane 36.

As shown in FIG. 1, the device of the first embodiment has the pressure-regulating valve 56 downstream of the medium-concentration separation unit 44. Hence, a set pressure (e.g., 150 kPa) of the pressure-regulating valve is applied to the path extending from the purge gas circulation pump 32 to the pressure-regulating valve 56. That is, in the first embodiment, a differential pressure as a difference between a fuel tank internal pressure (approximately equal to the atmospheric pressure) and the set pressure of the pressure-regulating valve 56 is applied across the first separating membrane 36, whereas a differential pressure as a difference between a negative pressure generated in the vicinity of the suction port of the purge gas circulation pump 32 and the set pressure of the pressure-regulating valve 56 is applied across the second separating membrane 46.

These differential pressures are higher than differential pressures in the case where the pressure-regulating valve 56 does not exist. As described already, the first separating membrane 36 and the second separating membrane 46 improve in concentrating performance in proportion to an increase in differential pressure between the upper chambers 38, 48 and the lower chambers 40, 50, respectively (see FIG. 2). Thus, in the device of the first embodiment, the first separating membrane 36 and the second separating membrane 46 are improved in the performance of concentrating fuel due to the fact that the pressure-regulating valve 56 exists.

As shown in FIG. 1, the device of the first embodiment has the negative pressure adjusting valve 30 between the purge gas circulation pump 32 and the canister 20. The negative pressure adjusting valve 30 can generate a negative pressure in the vicinity of the suction port of the purge gas circulation pump 32. The negative pressure thus generated is introduced into the lower chamber 50 of the medium-concentration separation unit 44 via the circulating gas passage 60.

If the negative pressure is introduced into the lower chamber 50, it is possible to increase a differential pressure applied to the second separating membrane 46 without increasing an internal pressure of the upper chamber 48. The second separating membrane 46 exerts a fuel concentration performance corresponding to a differential pressure that is applied. Thus, the device of the first embodiment makes it possible to apply a high differential pressure across the second separating membrane 46 without setting a pressure on the side of the upper chamber 48 as an excessively high value, and to ensure that the medium-concentration separation unit 44 achieves an excellent performance of concentrating fuel.

In the case where a high pressure is introduced into the upper chamber 48 of the medium-concentration separation unit 44, the path extending from the purge gas circulation pump 32 to the pressure-regulating valve 56 should have a pressure-proof structure corresponding to the high pressure. According to the device of the first embodiment, since the pressure to be generated in the upper chamber 48 can be held relatively low, the structure of the path can be simplified. In this respect, the device of the first embodiment is advantageous in attempting to achieve cost reduction and weight reduction of the system.

In the device of the first embodiment, while the purge gas circulation pump 32 is in operation, evaporative fuel gas continues to be discharged with the performance being constant. In this case, the high-concentration separation unit 34 and the medium-concentration separation unit 44 exert certain separation performances corresponding to set pressures of the pressure-regulating valve 56 and the negative pressure adjusting valve 30 respectively. In this case, the high-concentration separation unit 34 produces treating gas (high-concentration gas having a concentration equal to or higher than 95%) whose amount increases in proportion to an increase in concentration of canister outlet gas, and causes medium-concentration gas having a high concentration (approximately 40%) to flow out toward the medium-concentration separation unit 44. The medium-concentration separation unit 44 produces circulating gas (medium-concentration gas having a concentration of approximately 60%) whose amount increases in proportion to an increase in concentration of medium-concentration gas supplied from the high-concentration separation unit 34, and sets an amount of canister inlet gas (low-concentration gas having a concentration equal to or lower than 5%) as a small amount.

That is, in the device of the first embodiment, the flow rate of canister inlet gas decreases in proportion to an increase in concentration of canister outlet gas, and increases in proportion to a decrease in concentration of canister outlet gas. The concentration of canister outlet gas is high in the case where a large amount of evaporative fuel has been adsorbed by the canister 20, for example, immediately after the start of purge. The concentration of canister outlet gas decreases as the amount of evaporative fuel adsorbed by the canister 20 decreases in the course of purge. Thus, in the first embodiment, the flow rate of canister inlet gas increases in the course of purge.

Desorption of evaporative fuel adsorbed by the canister 20 is promoted in proportion to an increase in flow rate of canister inlet gas. Thus, the device of the first embodiment can make a decrease in amount of desorption of evaporative fuel gentler than a decrease in amount of adsorption of evaporative fuel. Accordingly, the evaporative fuel treating device of the first embodiment makes it possible to always ensure efficient progression of purge during implementation thereof, and to complete purge of evaporative fuel adsorbed by the canister 20 within a short period.

Figure 6:
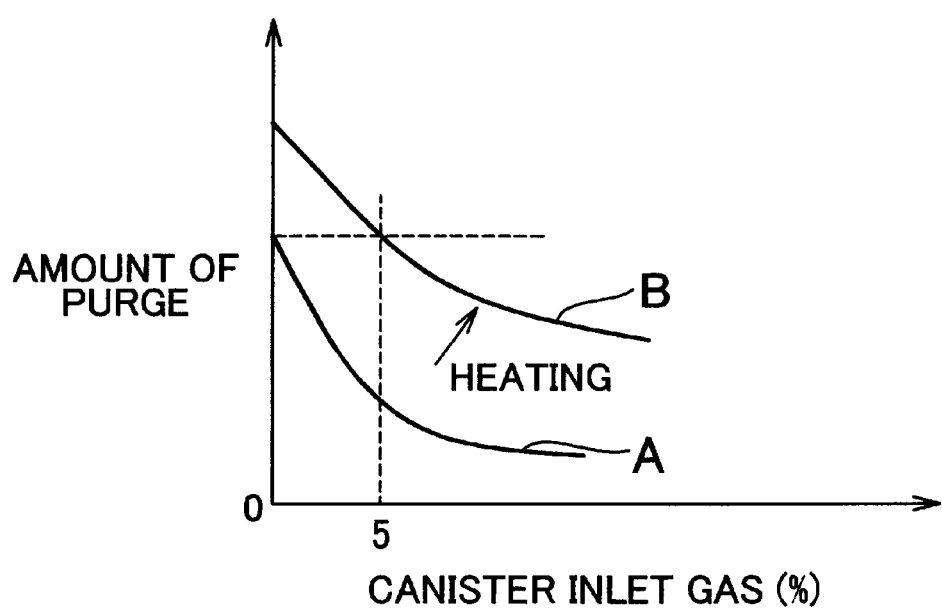
FIG. 6 is a graph showing, depending on whether heating is performed or not, a relationship between amount of evaporative fuel purged from a canister and concentration of canister inlet gas.

FIG. 6 shows the relationship between fuel concentration of canister inlet gas and amount of purge. The amount of purge shown in FIG. 6 represents an amount of fuel purged from the canister 20 by canister inlet gas having a suitable concentration in the case where the gas has been supplied to the canister 20 with the canister 20 being set in a reference adsorption state. In FIG. 6, a curve indicated by a symbol "A" represents a characteristic in the case where the heater 22 of the canister 20 has not generated heat, and a curve indicated by a symbol "B" represents a characteristic in the case where the heater 22 has generated a desired amount of heat.

As shown in FIG. 6, the amount of fuel purged from the canister 20 decreases in proportion to an increase in concentration of canister inlet gas. Thus, if evaporative fuel is contained in canister inlet gas, the same purge performance as in the case where air is caused to flow through the canister 20 cannot be achieved.

However, as indicated by the characteristics "A" and "B", the purge performance of the canister 20 is improved by heating the canister 20 by means of the heater 22. Hence, under an environment where the heater 22 generates a suitable amount of heat (the characteristic "B"), a purge performance equal to or higher than a purge performance (the characteristic "A") that is achieved by air under an environment where heating is not carried out can be ensured in a region where the concentration of canister inlet gas is equal to or lower than 5%.

In the first embodiment, the ECU 62 supplies suitable electric power to the heater 22 in the case where evaporative fuel in the canister 20 is to be purged. Hence, the device of the first embodiment makes it possible to efficiently purge evaporative fuel adsorbed in the canister 20 even by canister inlet gas having a fuel concentration of approximately 5%.

In the first embodiment, the medium-concentration separation unit 44 is disposed, as described already, above the high-concentration separation unit 34 in the three-dimensional arrangement. Hence, evaporative fuel gas discharged from the purge gas circulation pump 32 is treated in the upper chamber 38 of the high-concentration separation unit 34 and then flows into the upper chamber 48 of the medium-concentration separation unit 44, which is located above the upper chamber 38 of the high-concentration separation unit 34.

Because evaporative fuel is larger in specific gravity than air, high-concentration gas tends to be distributed in a lower part of a certain space. Thus, according to the above-mentioned three-dimensional arrangement, more high-concentration gas tends to be distributed in the upper chamber 38 of the high-concentration separation unit 34 than in the upper chamber 48 of the medium-concentration separation unit 44. From the standpoint of increasing a concentration of treating gas produced by the high-concentration separation unit 34 and holding the concentration of canister inlet gas flowing out from the medium-concentration separation unit 44 low, it is desirable that high-concentration gas exist in the upper chamber 38 of the high-concentration separation unit 34 and that low-concentration gas exist in the upper chamber 48 of the medium-concentration separation unit 44. According to the device of the first embodiment, this requirement is further satisfied by a positional relationship between the two separation units 34, 44.

Thus, the device of the first embodiment makes it possible to efficiently produce treating gas having a sufficiently high concentration and canister inlet gas having a sufficiently low concentration.

In the first embodiment, the fuel tank 10 is disposed, as described already, below the high-concentration separation unit 34 in the three-dimensional arrangement. Thus, treating gas produced in the lower chamber 40 of the high-concentration separation unit 34 flows downward through the treating gas passage 42 and then into the fuel tank 10.

Treating gas produced in the lower chamber 40 of the high-concentration separation unit 34 may be liquefied by being cooled naturally. According to the above-mentioned three-dimensional arrangement, liquid fuel thus produced automatically drops into the fuel tank 10. Thus, the device of the first embodiment makes it possible to reliably prevent liquid fuel from accumulating in the high-concentration separation unit 34 and the treating gas passage 42.

In the above-mentioned first embodiment, the heater 22 for heating the canister 20 is disposed therein. It is not absolutely required that the heater 22 be provided as a mechanism for heating the canister 20. That is, in the construction shown in FIG. 1, the purge gas circulation pump 32 never fails to generate heat as a result of operation under circumstances requiring evaporative fuel to be purged. Hence, in the case where a structure in which heat generated by the pump 32 is transmitted to the canister 20 is realized, for example, in the case where the purge gas circulation pump 32 is integrated with the canister 20, it is preferable that the heater 22 be dispensed with and that the purge gas circulation pump 32 be employed as a mechanism for heating the canister 20.

In the above-mentioned first embodiment, the purge gas circulation pump 32 functions as a "canister outlet gas producing means," and the high-concentration separation unit 34 and the medium-concentration separation unit 44 function as "vapor concentrating means."

In the above-mentioned first embodiment, the heater 22 functions as "desorption promoting means" and as "canister heating means."

Next, a second embodiment of the invention will be described with reference to FIGS. 7 and 8.

Figure 7:
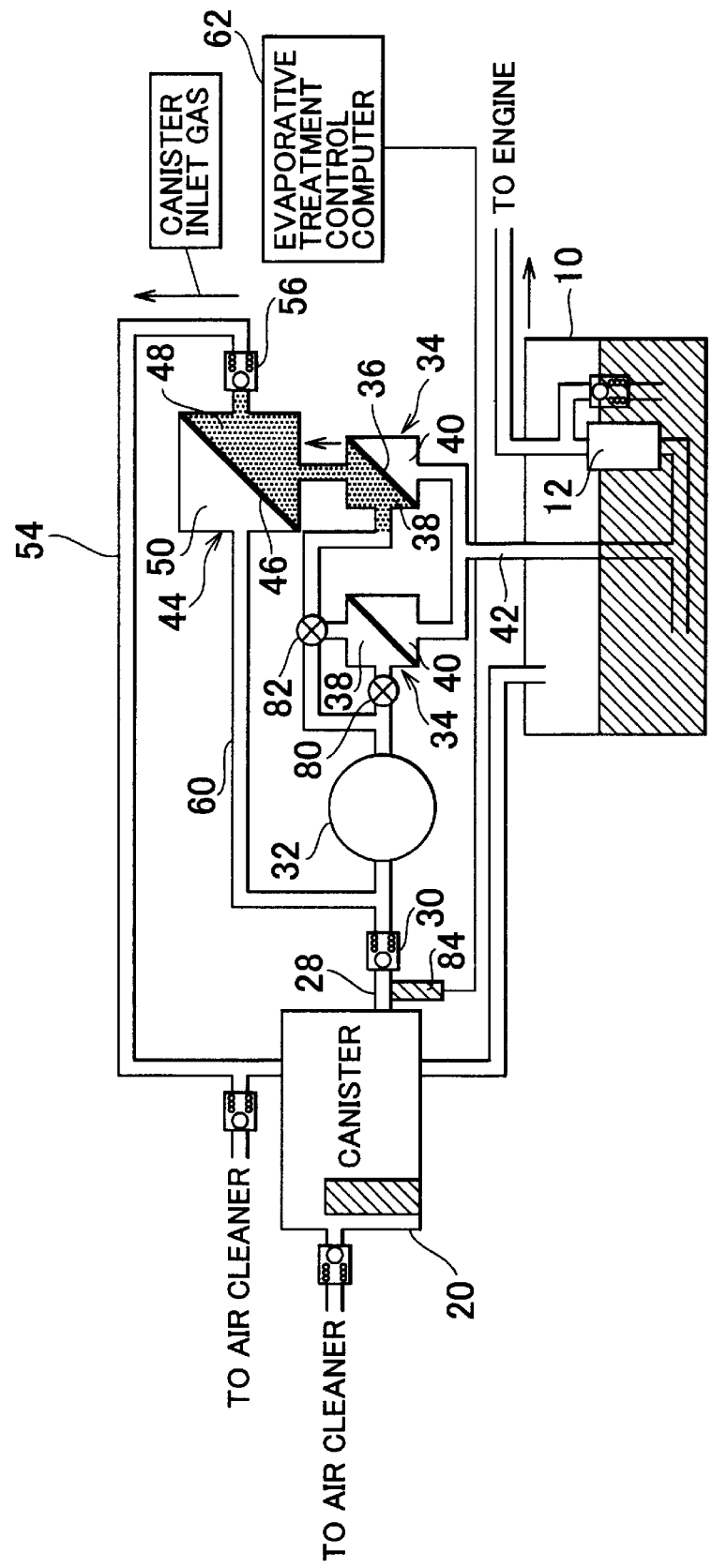
FIG. 7 is an explanatory view of the construction of an evaporative fuel treating device in accordance with a second embodiment of the invention.

FIG. 7 is an explanatory view of the construction of the evaporative fuel treating device in accordance with the second embodiment. In FIG. 7, components identical to those shown in FIG. 1 are denoted by the same reference symbols, and description thereof will be omitted or simplified.

The device of the second embodiment has a plurality of high-concentration separation units 34. More specifically, the number of the high-concentration separation units 34 provided in the second embodiment is two. The lower chamber 40 of either of the high-concentration separation units 34 leads to the treating gas passage 42. The upper chamber 38 of the first or pre-stage high-concentration separation unit 34 communicates with the discharge port of the purge gas circulation pump 32 via a control valve 80. On the other hand, the upper chamber 38 of the second or post-stage high-concentration separation unit 34 communicates with the upper chamber 38 of the pre-stage high-concentration separation unit 34 and the discharge port of the purge gas circulation pump 32 via a three-way control valve 82.

The control valve 80 opens and closes by being controlled by the ECU 62. The control valve 80 selectively is placed in a state where the upper chamber 38 of the pre-stage high-concentration separation unit 34 leads to the discharge port of the purge gas circulation pump 32 and a state where the former is shut off from the latter. By being controlled by the ECU 62, the three-way control valve 82 selectively is placed in a state where the upper chamber 38 of the post-stage high-concentration separation unit 34 leads to the upper chamber 38 of the pre-stage high-concentration separation unit 34 and a state where the upper chamber 38 of the post-stage high-concentration separation unit 34 leads to the discharge port of the purge gas circulation pump 32.

In the second embodiment, the ECU 62 controls the control valve 80 and the three-way control valve 82 and thereby selectively achieves a state where evaporative fuel gas discharged from the purge gas circulation pump 32 flows into the upper chamber 38 of the post-stage high-concentration separation unit 34 via the upper chamber 38 of the pre-stage high-concentration separation unit 34 and a state where the gas flows directly into the post-stage upper chamber 38 from the discharge port of the pump 32 without flowing through the pre-stage upper chamber 38. Hereinafter, the former will be referred to as "a high-concentration unit double-stage state" and the latter will be referred to as "a high-concentration unit single-stage state".

In the device of the second embodiment, a concentration sensor 84 for measuring a concentration of canister outlet gas is disposed in the purge passage 28. The ECU 62 can detect a fuel concentration of canister outlet gas purged from the canister 20 on the basis of an output from the concentration sensor 84.

In the device of the second embodiment, if it is assumed that evaporative fuel gas discharged from the purge gas circulation pump 32 is always treated by the high-concentration separation unit 34 on the same condition, the concentration of treating gas supplied to the fuel tank 10 and the concentration of medium-concentration gas supplied to the medium-concentration separation unit 44 increase in proportion to an increase in concentration of canister outlet gas. If the concentration of medium-concentration gas supplied to the medium-concentration separation unit 44 is unduly high, the concentration of canister inlet gas cannot be held lower than 5% in some cases.

On the other hand, if the area ratio between the first separating membrane 36 included in the high-concentration separation unit 34 and the second separating membrane 46 included in the medium-concentration separation unit 44 is changed in accordance with the concentration of canister outlet gas, changes in concentration of treating gas and canister inlet gas relative to changes in concentration of canister outlet gas can be held small.

By making a shift between the above-mentioned high-concentration unit double-stage state and the above-mentioned high-concentration unit single-stage state, the device of the second embodiment makes it possible to change an area ratio between the first separating membrane 36 and the second separating membrane 46. Thus, the device of the second embodiment suitably makes a shift between the high-concentration unit double-stage state and the high-concentration unit single-stage state in accordance with a concentration of canister outlet gas so as to prevent concentrations of treating gas and canister inlet gas from noticeably deviating from their target values.

Figure 8:
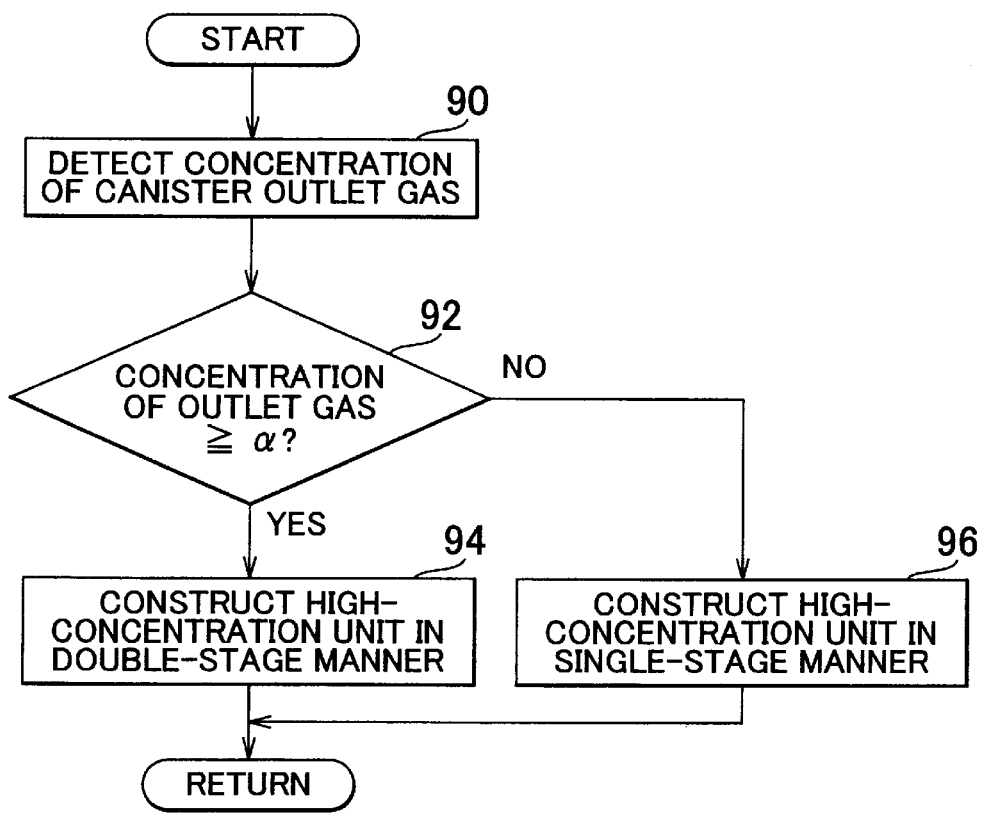
FIG. 8 is a flowchart of a control routine that is executed in the device of the second embodiment.

FIG. 8 is the flowchart of the control routine that is executed by the ECU 62 so as to realize the above-mentioned function. In the routine shown in FIG. 8, a concentration of canister outlet gas is first detected on the basis of an output from the concentration sensor 84 (step 90). Next, it is determined whether or not the detected concentration of canister outlet gas is equal to or higher than a predetermined criterion value $\alpha$ (step 92).

As a result, if it is determined that the concentration of canister outlet gas is equal to or higher than $\alpha$, the control valve 80 and the three-way control valve 82 are controlled such that the high-concentration unit double-stage state is established (step 94). On the other hand, if it is determined that the concentration of canister outlet gas is not equal to or higher than $\alpha$, the control valve 80 and the three-way control valve 82 are controlled such that the high-concentration unit single-stage state is established (step 96).

As described above, according to the routine shown in FIG. 8, the high-concentration unit double-stage state can be established if the concentration of canister outlet gas is equal to or higher than α. According to the high-concentration unit double-stage state, canister outlet gas having a high concentration is first treated by the pre-stage high-concentration separation unit 34, then is treated by the post-stage high-concentration separation unit 34, and then is supplied to the medium-concentration separation unit 44. In this case, medium-concentration gas supplied to the medium-concentration separation unit 44 does not have an excessively high concentration despite the fact that canister outlet gas has a high concentration. Thus, even under such an environment, the device of the second embodiment makes it possible to reliably hold the concentration of canister inlet gas flowing out from the medium-concentration separation unit 44 equal to or lower than 5%.

In the case where the high-concentration unit double-stage state has been established, high-concentration treating gas produced in the pre-stage high-concentration separation unit 34 and treating gas that has a relatively low concentration and that has been produced in the post-stage high-concentration separation unit 34 are supplied to the treating gas passage 42. In this case, a large amount of treating gas having a suitable concentration (approximately 95%) can be caused to flow through the treating gas passage 42. Thus, the device of the second embodiment can exert an excellent performance of treating evaporative fuel in the case where canister outlet gas has a high concentration.

Furthermore, the routine shown in FIG. 8 makes it possible to establish the high-concentration unit single-stage state if the concentration of canister outlet gas is lower than α. According to the high-concentration unit single-stage state, canister outlet gas is discharged from the purge gas circulation pump 32, is treated by the post-stage high-concentration separation unit 34, and then is supplied to the medium-concentration separation unit 44. In this case, the concentration of treating gas can be held high despite the fact that the concentration of canister outlet gas is relatively low. Thus, even under such an environment, the device of the second embodiment makes it possible to produce treating gas having a sufficiently high concentration.

In the above-mentioned second embodiment, a shift between the high-concentration unit double-stage state and the high-concentration unit single-stage state is made on the basis of a concentration of canister outlet gas. It is not necessary that the data on which the shift is based be the concentration of canister outlet gas itself. That is, it is sufficient that the data on which the shift is based be correlated to the concentration of canister outlet gas. For instance, a shift between the high-concentration unit double-stage state and the high-concentration unit single-stage state may be made on the basis of a concentration of mixed gas discharged from the purge gas circulation pump 32 or a concentration of treating gas produced by the high-concentration separation unit 34.

In the above-mentioned second embodiment, the state where canister outlet gas flows through the pre-stage high-concentration separation unit 34 and the state where canister outlet gas bypasses the pre-stage high-concentration separation unit 34 are selectively realized. However, the control method is not limited thereto. For example, it is also preferable that the control valve 80 and the three-way control valve 82 be linearly controlled and that the ratio between flow rate of gas flowing through the pre-stage high-concentration separation unit 34 and flow rate of gas bypassing the pre-stage high-concentration separation unit 34 be changed with respect to the concentration of canister outlet gas. The control method as described herein can substantially establish the same state as in the case where the area ratio between the first separating membrane 36 and the second separating membrane 46 is changed in accordance with the concentration of canister outlet gas.

In the above-mentioned second embodiment, the concentration sensor 84 functions as a "concentration detecting means", and the control valve 80 and the three-way control valve 82 function as "variable area ratio means." Also, the ECU 62 performs processings in the above-mentioned steps 94 and 96 to function as an "area ratio control means."

In the above-mentioned second embodiment, a chamber (a chamber composed of the upper chamber 38 and the lower chamber 40) included in each of the two high-concentration separation units 34 function as a "treating chamber." The first separating membrane 36 included in each of the two high-concentration separation units 34 functions as a corresponding one of "the plurality of portions." Further, the passage connecting the discharge port of the purge gas circulation pump 32 and the pre-stage upper chamber 38 to each other and the passage connecting the discharge port of the purge gas circulation pump 32 and the post-stage upper chamber 38 to each other function as "two passages." Furthermore, the control valve 80 and the three-way control valve 82 function as a "valve mechanism." The ECU 62 performs the processings in the above-mentioned steps 94 and 96 to function as a "valve mechanism control means."

Next, a third embodiment of the invention will be described with reference to FIG. 9.

Figure 9:
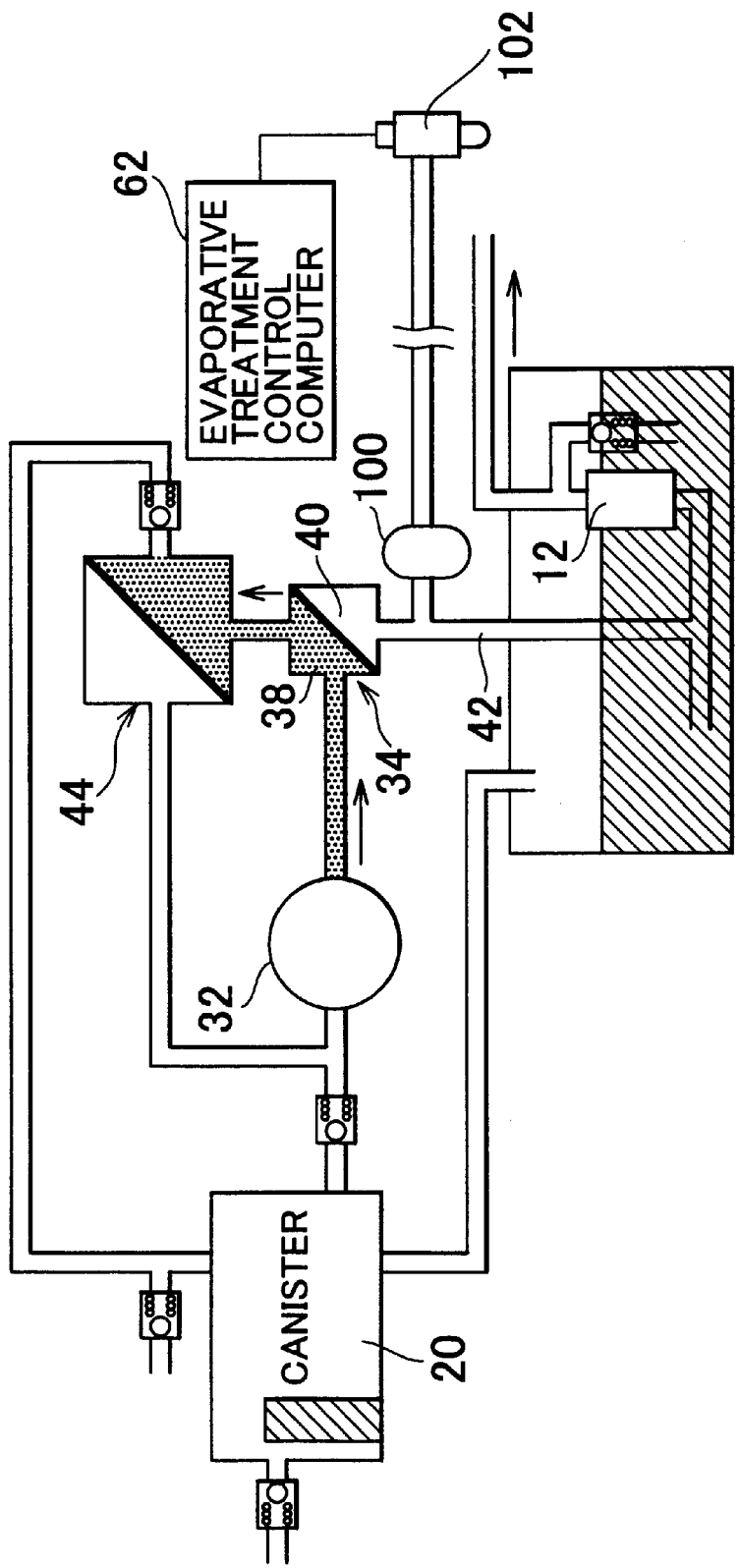
FIG. 9 is an explanatory view of the construction of an evaporative fuel treating device in accordance with a third embodiment of the invention.

FIG. 9 is an explanatory view of the construction of the evaporative fuel treating device in accordance with the third embodiment. In FIG. 9, components identical to those shown in FIG. 1 are denoted by the same reference symbols, and description thereof will be omitted or simplified.

As shown in FIG. 9, the evaporative fuel treating device of the third embodiment has a treating gas tank 100 that communicates with the treating gas passage 42. The treating gas tank 100 can accumulate treating gas that is produced in the lower chamber 40 of the high-concentration separation unit 34. A fuel gas injection valve 102 that is disposed in the internal combustion engine (not shown) communicates with the treating gas tank 100. The fuel gas injection valve 102 is provided in addition to normal fuel injection valves for injecting liquid fuel, and can inject treating gas as fuel into the internal combustion engine.

In the third embodiment, the ECU 62 controls the fuel gas injection valve 102 such that treating gas is injected into the internal combustion engine during start thereof. Treating gas in a gaseous state and thus is more likely to burn than liquid fuel. Thus, the device of the third embodiment makes it possible to enhance combustibility of fuel during start of the internal combustion engine and thus to improve startability of the internal combustion engine and exhaust emission properties during start thereof.

In the above-mentioned third embodiment, treating gas is always injected when the internal combustion engine is started. However, the invention is not limited thereto. That is, it is also preferable that treating gas be injected only when startability of the internal combustion engine tends to deteriorate, for example, when the internal combustion engine is started at a low temperature.

In the above-mentioned third embodiment, the ECU 62 controls the fuel gas injection valve 102 such that treating gas is injected during start of the internal combustion engine, and thus functions with the valve 102 as a "fuel gas supplying means."

Next, a fourth embodiment of the invention will be described with reference to FIG. 10.

Figure 10:
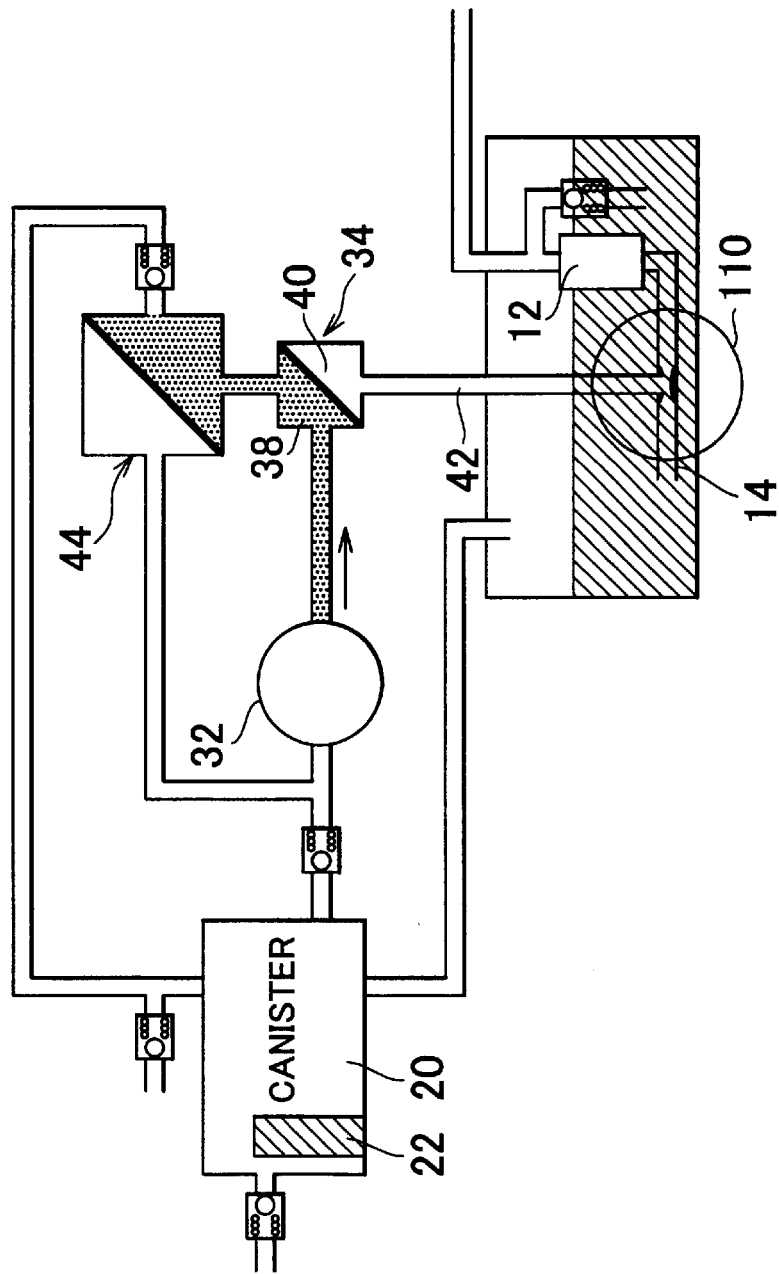
FIG. 10 is an explanatory view of the construction of an evaporative fuel treating device in accordance with a fourth embodiment of the invention.

FIG. 10 is an explanatory view of the construction of the evaporative fuel treating device in accordance with the fourth embodiment. In FIG. 10, components identical to those shown in FIG. 1 are denoted by the same reference symbols, and description thereof will be omitted or simplified.

As shown in FIG. 10, the device of the fourth embodiment has a venturi 110 in a connecting portion between the treating gas passage 42 and the suction pipe 14 leading to the feed pump 12. The venturi 110 is provided such that a negative pressure is generated in the connecting portion between the suction pipe 14 and the treating gas passage 42 if liquid fuel is sucked by the feed pump 12.

If a negative pressure is generated in the above-mentioned connecting portion, treating gas in the treating gas passage 42 can be efficiently sucked into the suction pipe 14. Thus, the device of the fourth embodiment makes it possible to cause the feed pump 12 to suck treating gas produced by the high-concentration separation unit 34 without providing a special pressurizing mechanism or the like, and to ensure an excellent performance of treating evaporative fuel while employing a simple system construction.

Next, a fifth embodiment of the invention will be described with reference to FIGS. 11 to 13.

Figure 11:
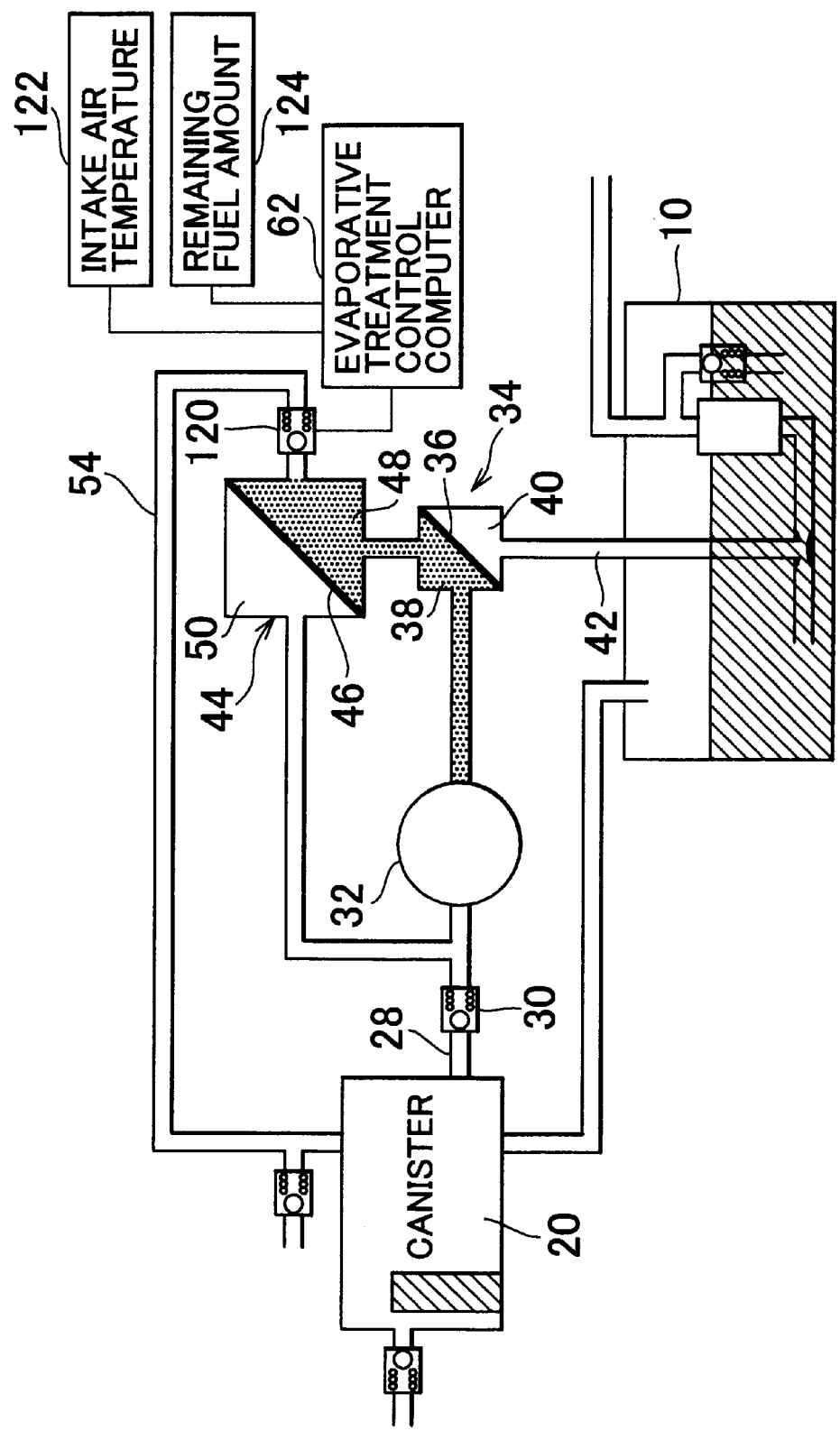
FIG. 11 is an explanatory view of the construction of an evaporative fuel treating device in accordance with a fifth embodiment of the invention.

FIG. 11 is an explanatory view of the construction of the evaporative fuel treating device in accordance with the fifth embodiment. In FIG. 11, components identical to those shown in FIG. 1 are denoted by the same reference symbols, and description thereof will be omitted or simplified.

The above-mentioned device of the first embodiment performs the process of concentrating evaporative fuel with a constant performance that is determined by specifications of the high-concentration separation unit 34 and the medium-concentration separation unit 44 or the pressure-regulating valve 56, the negative pressure adjusting valve 30, and the like. The amount of evaporative fuel generated inside the fuel tank 10 increases in proportion to an increase in temperature of the atmosphere surrounding the fuel tank 10. Thus, the amount of evaporative fuel flowing into the canister 20 increases in proportion to an increase in temperature of the atmosphere surrounding the fuel tank 10. In addition, when refueling, a large amount of evaporative fuel that exists in the tank flows into the canister 20 as the liquid level of the fuel tank 10 rises.

From the standpoint of preventing evaporative fuel from being discharged into the atmosphere without imposing an excessive burden on the evaporative fuel treating device, it is effective that the fuel treating performance of the device be changed in accordance with an amount of evaporative fuel flowing into the canister 20. Thus, the fuel treating performance of the device of the fifth embodiment is enhanced under an environment in which a large amount of evaporative fuel is likely to be generated, for example, at a high outside air temperature or immediately after refueling.

In order to realize the above-mentioned function, the device of the fifth embodiment has a variable pressure-regulating valve 120 downstream of the medium-concentration separation unit 44. The variable pressure-regulating valve 120 is a valve mechanism that can change a set pressure in accordance with a control signal supplied from the ECU 62. By changing pressures generated in the upper chamber 38 of the high-concentration separation unit 34 and the upper chamber 48 of the medium-concentration separation unit 44, the variable pressure-regulating valve 120 makes it possible to change separating performances of the first separating membrane 36 and the second separating membrane 46, that is, to change a fuel treating performance of the evaporative fuel treating device.

The device of the fifth embodiment also has an intake air temperature sensor 122 for detecting a temperature of air sucked into the internal combustion engine (not shown), that is, an intake air temperature THA, and a remaining fuel amount sensor 124 for detecting an amount of fuel remaining in the fuel tank 10. The ECU 62 can detect the intake air temperature THA and the amount of remaining fuel on the basis of outputs from the sensors 122, 124.

Figure 12:
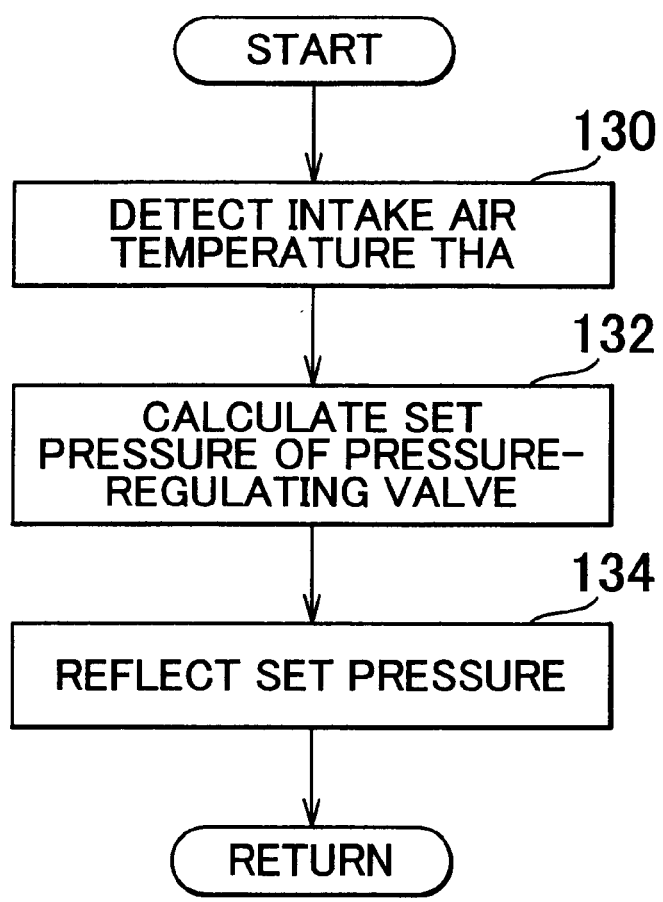
FIG. 12 is a flowchart of a first control routine that is executed in the device of the fifth embodiment.

FIG. 12 is a flowchart of the control routine that is executed by the ECU 62 in the fifth embodiment so as to change a fuel treating performance of the device in accordance with an outside air temperature. In the routine shown in FIG. 12, an intake air temperature THA is first detected on the basis of an output from the intake air temperature sensor 122 (step 130). A set pressure of the variable pressure-regulating valve 120 is then calculated on the basis of the detected intake air temperature THA (step 132). Then, a process of causing a state of the variable pressure-regulating valve 120 to reflect the set pressure calculated as described above, more specifically, a process of outputting a control signal corresponding to the set pressure to the variable pressure-regulating valve 120 is performed (step 134).

The set pressure of the variable pressure-regulating valve 120 is a factor for determining a fuel treating performance of the device, and is to be set in accordance with an amount of generation of evaporative fuel. The amount of generation of evaporative fuel is correlated to the intake air temperature THA. Thus, the set pressure of the variable pressure-regulating valve 120 is to be specified in relation to the intake air temperature THA. In the fifth embodiment, a map determining a suitable relationship between set pressure and intake air pressure THA is stored in the ECU 62. In the above-mentioned step 132, a set pressure corresponding to the intake air temperature THA, that is, a set pressure corresponding to a situation in which evaporative fuel is generated is calculated by referring to the map.

The above-mentioned routine shown in FIG. 12 makes it possible to reduce the set pressure of the variable pressure-regulating valve 120 under an environment where outside air is at a low temperature and where a small amount of evaporative fuel is likely to be generated. Thus, the device of the fifth embodiment makes it possible to simplify the pressure-proof structure of the system and to achieve weight reduction and cost reduction in comparison with a case where the pressure upstream of the variable pressure-regulating valve 120 is always high.

Further, the above-mentioned routine shown in FIG. 12 makes it possible to ensure a sufficient performance of treating evaporative fuel by increasing the set pressure of the variable pressure-regulating valve 120 under an environment where outside air is at a high temperature and where a large amount of evaporative fuel is likely to be generated. Thus, the device of the fifth embodiment makes it possible to effectively prevent evaporative fuel from being discharged into the atmosphere even under an environment in which outside air is at a high temperature.

Figure 13:
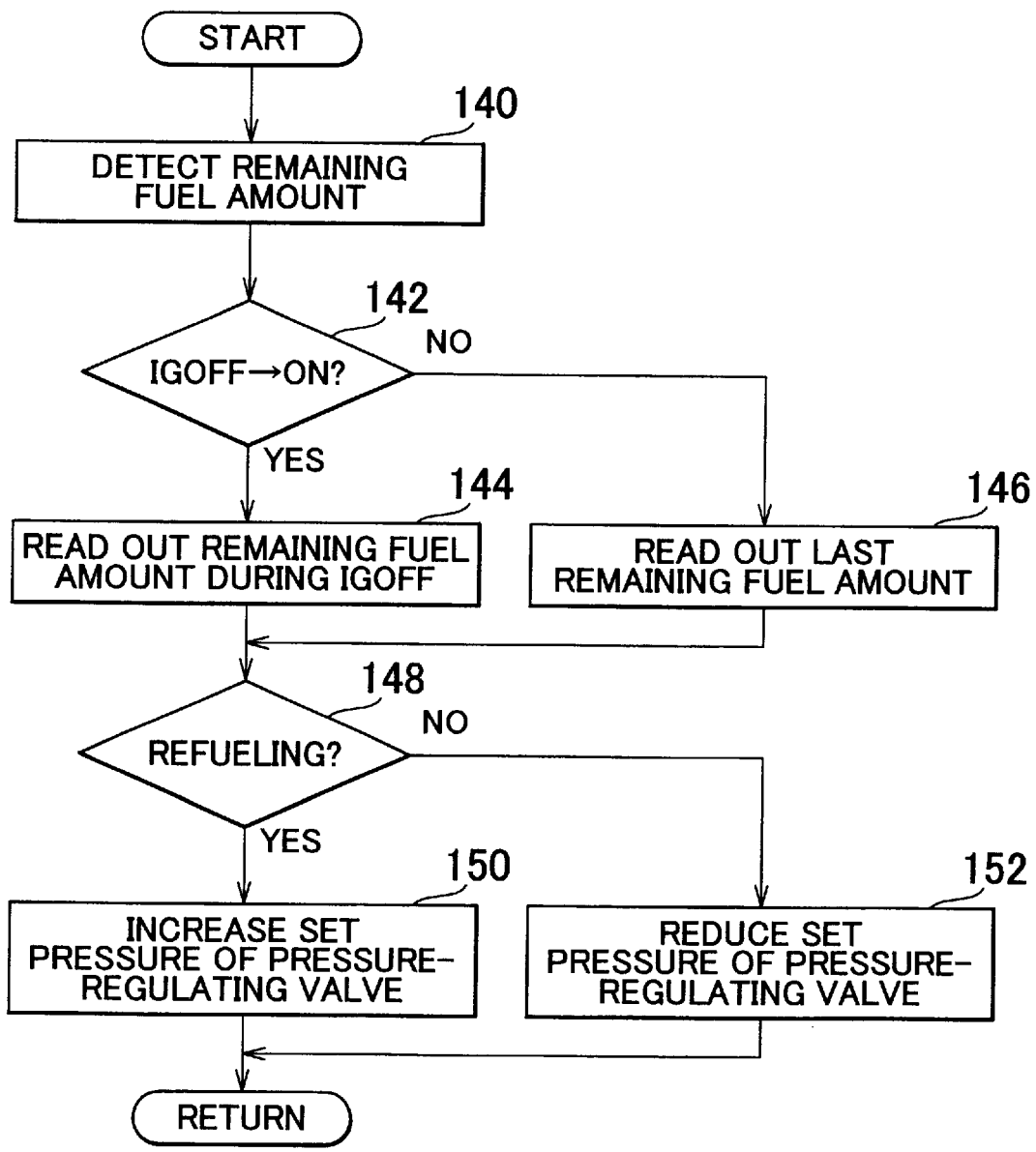
FIG. 13 is a flowchart of a second control routine that is executed in the device of the fifth embodiment.

FIG. 13 is a flowchart of the control routine that is executed by the ECU 62 in the fifth embodiment so as to enhance a fuel treating performance during refueling. In the routine shown in FIG. 13, a remaining fuel amount is first detected on the basis of an output from the remaining fuel amount sensor 124 (step 140). The remaining fuel amount thus detected is stored at least until a subsequent processing cycle is carried out. If an ignition switch (IG switch) of the vehicle has been turned OFF after storage of the remaining fuel amount, the ECU 62 holds the remaining fuel amount until the present routine is executed at least once after the IG switch is later turned ON.

Then, after the ignition (IG) switch has been switched from OFF to ON, it is determined whether or not the present processing cycle is the first processing cycle (step 142). If the condition in the above-mentioned step 142 is fulfilled, the latest remaining fuel amount stored before turning the IG switch OFF is read out (step 144). Refueling is usually carried out with the IG switch being OFF. In the case where refueling is thus carried out, the processing in the present step 144 makes it possible to detect an amount of remaining fuel immediately before refueling as soon as the IG switch is turned ON upon termination of refueling. In the above-mentioned step 142, if it is determined that the present processing cycle is not the first cycle after the IG switch has been turned ON, a remaining fuel amount stored during the last processing cycle is read out (step 146).

If the processing in the above-mentioned step 144 or 146 is terminated, it is then determined, on the basis of a comparison between the remaining fuel amount read out in one of those steps and the current remaining fuel amount detected in the above-mentioned step 140, whether or not refueling has been carried out or being carried out (step 148). If it is determined as a result that refueling has been carried out or is being carried out, the set pressure of the variable pressure-regulating valve 120 is set as a predetermined high-pressure set value (step 50). If the set pressure is set as the high-pressure set value through the processing in the present step 150, high pressures are applied to the first separating membrane 36 and the second separating membrane 46, and the performance of treating evaporative fuel is enhanced. Thus, the device of the fifth embodiment makes it possible to effectively prevent evaporative fuel from overflowing from the canister and being discharged into the atmosphere even when a large amount of evaporative fuel is generated, namely, even during refueling.

On the other hand, if it is determined in the above-mentioned step 148 that refueling has not been carried out, the set pressure of the variable pressure-regulating valve 120 is set as a predetermined low-pressure set value (step 152). If the set pressure is set as the low-pressure set value through the processing in the present step 152, a low pressure is applied to the path extending from the purge gas circulation pump 32 to the variable pressure-regulating valve 120. Thus, the device of the fifth embodiment makes it possible to simplify the pressure-proof structure of the system in comparison with a case where a high pressure is always applied to the path, and to achieve weight reduction and cost reduction.

In the above-mentioned fifth embodiment, the performance of treating evaporative fuel is changed by changing the set pressure of the variable pressure-regulating valve 120. However, the method of changing the performance of treating evaporative fuel is not limited thereto. For example, even in the case where the set pressure of the pressure-regulating valve is constant, if the flow rate of gas discharged from the purge gas circulation pump 32 changes, the flow resistance of the pressure-regulating valve changes. As a result, the pressures applied to the first separating membrane 36 and the second separating membrane 46 change. Thus, it is also preferable that the performance of treating evaporative fuel be changed by changing the discharge amount of the purge gas circulation pump 32.

In the device of the fifth embodiment, the concentration of canister outlet gas can be changed by changing the heat generation amount of the heater 22 built into the canister 20. The amount of evaporative fuel that can be treated by the device of the fifth embodiment increases in proportion to an increase in concentration of canister outlet gas. Thus, it is also preferable that the performance of treating evaporative fuel be changed by changing the amount of electric power supplied to the heater 22.

In the above-mentioned fifth embodiment, a valve mechanism whose set pressure can be electrically changed is employed as the variable pressure-regulating valve 120. However, the variable pressure-regulating valve 120 is not limited to such a valve mechanism. That is, the variable pressure-regulating valve 120 may also be realized by a mechanical valve mechanism whose opening load is changed in accordance with an atmospheric temperature through the function of a shape memory alloy or the like. According to the valve mechanism of this type, although it may not be possible to change the treating performance during refueling, it is possible to realize a function of changing the treating performance in accordance with an outside air temperature with a simple construction.

In the above-mentioned fifth embodiment, the variable pressure-regulating valve 120 functions as a "variable treating performance means." The ECU 62 performs the processing in the above-mentioned step 130 or 148 to function as a "required treatment amount acquiring means." The ECU 62 performs the processings in the above-mentioned steps 132 and 134 or the processings in the above-mentioned steps 150 and 152 to function as a "treating performance control means."

In the above-mentioned fifth embodiment, the variable pressure-regulating valve 120 also functions as a "variable pressure means," and as a "variable pressure-regulating valve set pressure means." The ECU 62 performs the processings in the above-mentioned steps 132 and 134 or the above-mentioned steps 150 and 152 to function as a "pressure control means" as a "set pressure control means."

In the above-mentioned fifth embodiment, in the case where a construction in which the performance of treating evaporative fuel is changed in accordance with a discharge amount of the purge gas circulation pump 32 is adopted, "a variable discharge performance means" can be realized by a mechanism that makes it possible to change the discharge amount. Also, "a discharge performance control means" can be realized by causing the ECU 62 to perform the processing of changing the discharge amount.

In the above-mentioned fifth embodiment, in the case where a construction in which the performance of treating evaporative fuel is changed by the heater 22 of the canister 20 is adopted, the heater 22 functions as a "canister heating means." Also, "a heat generation amount control means" can be realized by causing the ECU 62 to perform the processing of changing the heat generation amount of the heater 22.

Figure 14:
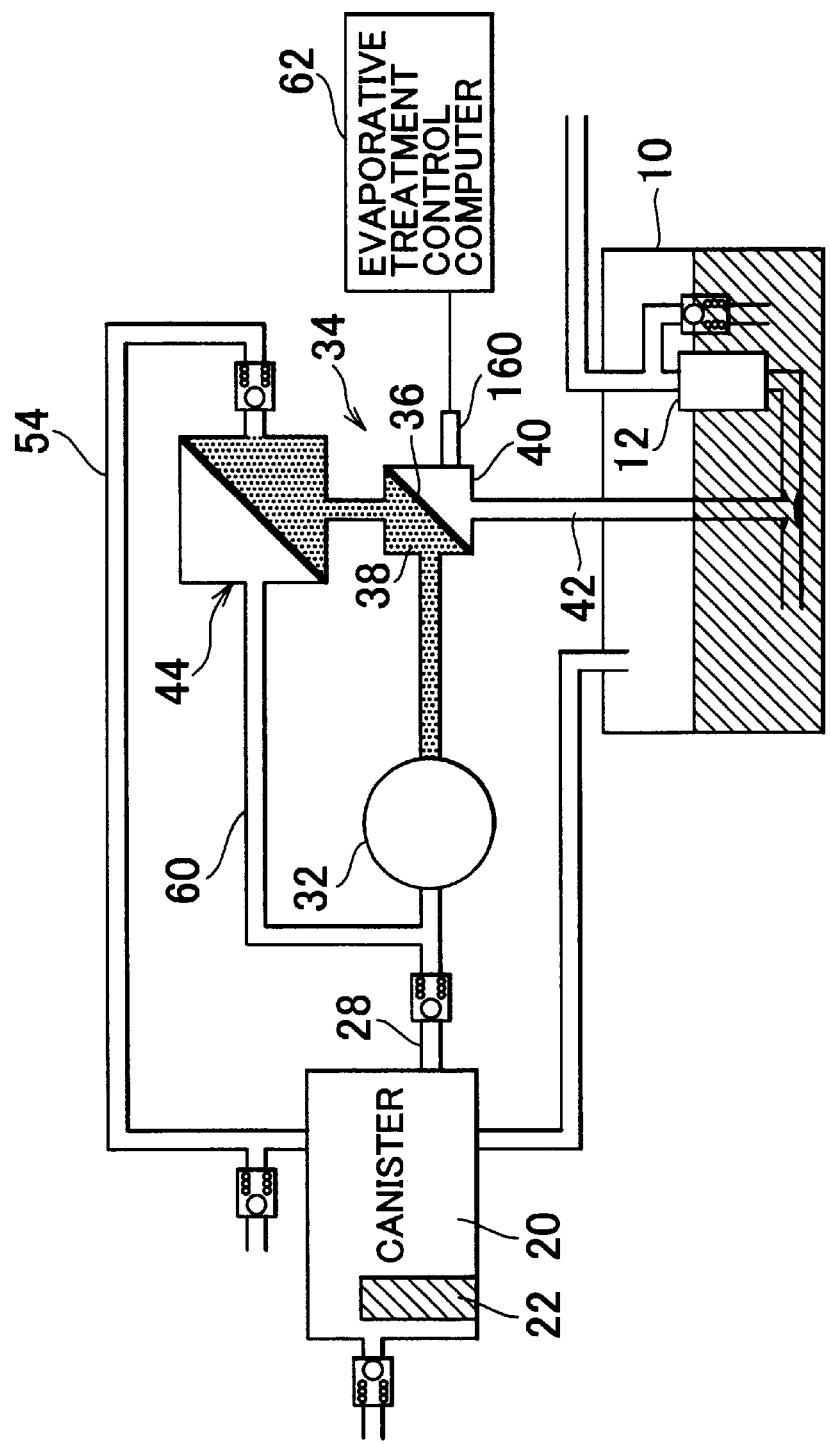
FIG. 14 is an explanatory view of the construction of an evaporative fuel treating device in accordance with a sixth embodiment of the invention.

Next, a sixth embodiment of the invention will be described with reference to FIGS. 14 and 15. FIG. 14 is an explanatory view of the construction of the evaporative fuel treating device in accordance with the sixth embodiment. In FIG. 14, components identical to those shown in FIG. 1 are denoted by the same reference symbols, and description thereof will be omitted or simplified.

As shown in FIG. 14, the device of the sixth embodiment has a concentration sensor 160 that is disposed in the lower chamber 40 of the high-concentration separation unit 34. The concentration sensor 160 generates an output corresponding to a concentration of treating gas produced by the high-concentration separation unit 34. The ECU 62 can detect a concentration of treating gas on the basis of an output from the concentration sensor 160.

As in the case of the device of the first embodiment, the device of the sixth embodiment uses canister inlet gas containing evaporative fuel having a concentration of approximately 5% as a gas for desorbing evaporative fuel. To make effective purge possible by using such a gas, the canister 20 is heated by the heater 22. Hence, from the standpoint of causing the device of the sixth embodiment to function normally, it is preferable that the heater 22 function properly. Accordingly, in the device of the sixth embodiment, it is useful to detect an abnormality in the heater 22 without delay.

Figure 15:
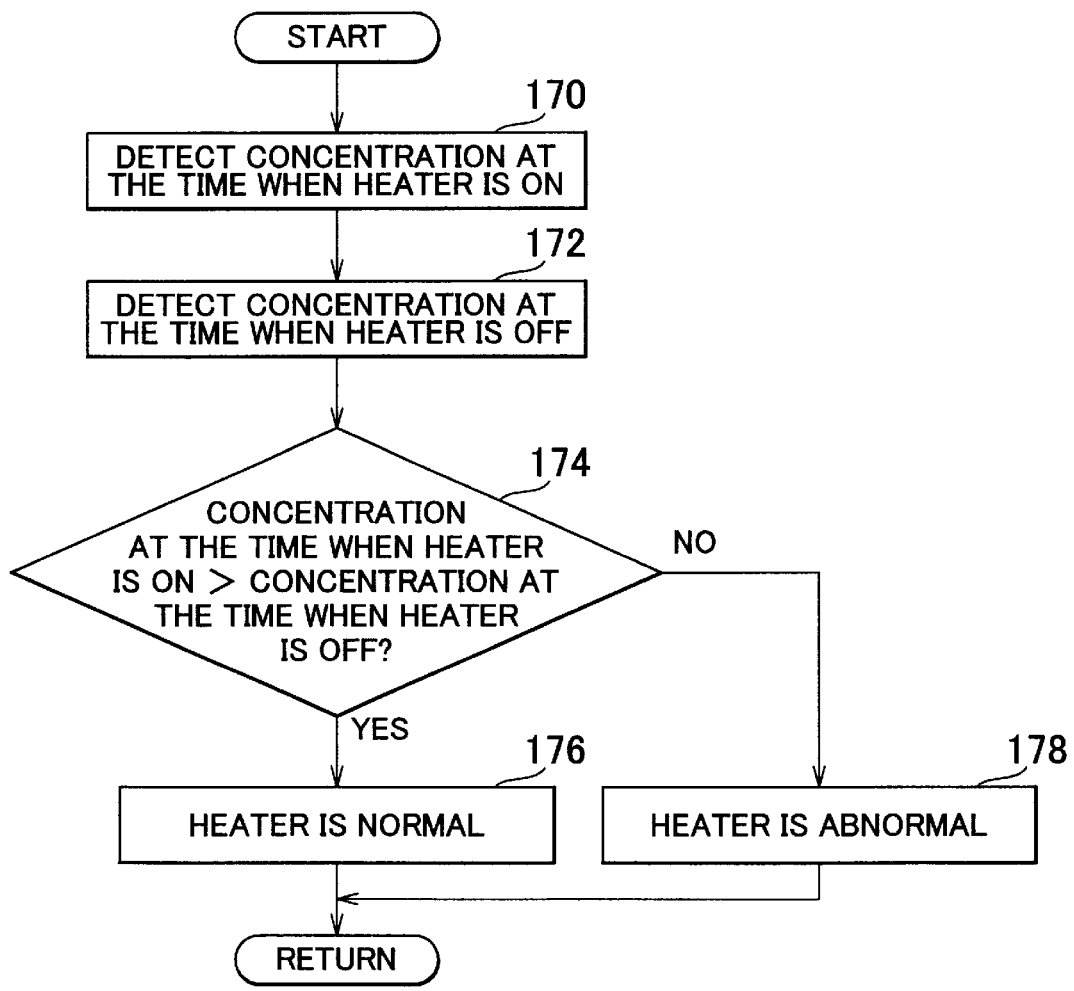
FIG. 15 is a flowchart of a control routine that is executed in the device of the sixth embodiment.

FIG. 15 is a flowchart of the control routine that is executed by the ECU 62 so as to determine whether or not the heater 22 is operating normally. The routine shown in FIG. 15 is executed with a suitable frequency, for example, every time the vehicle is started, every time a predetermined period elapses, or every time the vehicle covers a predetermined distance.

In the routine shown in FIG. 15, a concentration of treating gas is first detected on the basis of an output from the concentration sensor 160 with the heater 22 being ON (step 170). Then, a concentration of treating gas is detected with the heater 22 being OFF (step 172). If the heater 22 is normal, the concentration of canister outlet gas is higher in the case where the heater 22 is ON than in the case where the heater 22 is OFF. The concentration of treating gas is correlated to the concentration of canister outlet gas. Therefore, if the heater 22 is normal, the concentration of treating gas is also higher in the case where the heater 22 is ON than in the case where the heater 22 is OFF. Thus, in the device of the sixth embodiment, if the concentration of treating gas at the time when the heater 22 is ON is sufficiently higher than the concentration of treating gas at the time when the heater 22 is OFF, it is possible to determine that the heater 22 is normal. On the contrary, if there is no noticeable difference between those concentrations, it is possible to determine that the heater 22 is not functioning normally.

In the routine shown in FIG. 15, after the processing in the above-mentioned step 172 has been performed, it is determined whether or not the concentration of treating gas at the time when the heater 22 is ON is sufficiently higher than the concentration of treating gas at the time when the heater 22 is OFF (step 174). If it is determined as a result that the concentration at the time when the heater 22 is ON is sufficiently higher than the concentration at the time when the heater 22 is OFF, it is determined that the heater 22 is normal (step 176). On the other hand, if it is determined that the above-mentioned condition has not been fulfilled, it is determined that the heater 22 suffers an abnormality such as breaking or deterioration (step 178).

As described above, the routine shown in FIG. 15 makes it possible to make a determination on a state of the heater 22 with high precision on the basis of a concentration of treating gas. Thus, according to the device of the sixth embodiment, if an abnormality has occurred in the heater 22, the abnormality can be detected with high precision and without delay.

In the above-mentioned sixth embodiment, a determination of a state of the heater 22 is made on the basis of a concentration of treating gas. It is not indispensable that data on which the determination is based be the concentration of treating gas. That is, it is sufficient that the data on which the determination is based be correlated to the concentration of canister outlet gas. For instance, a determination on a state of the heater 22 may be made on the basis of a concentration of canister outlet gas itself, a concentration of mixed gas discharged from the purge gas circulation pump 32, or the like.

In the above-mentioned sixth embodiment, the heater 22 functions as a "desorption promoting means," and the concentration sensor 160 functions as a "concentration detecting means." The ECU 62 performs the processing in the above-mentioned step 174 to function as an "abnormality determining means."

Next, a seventh embodiment of the invention will be described with reference to FIGS. 16 to 18.

Figure 16:
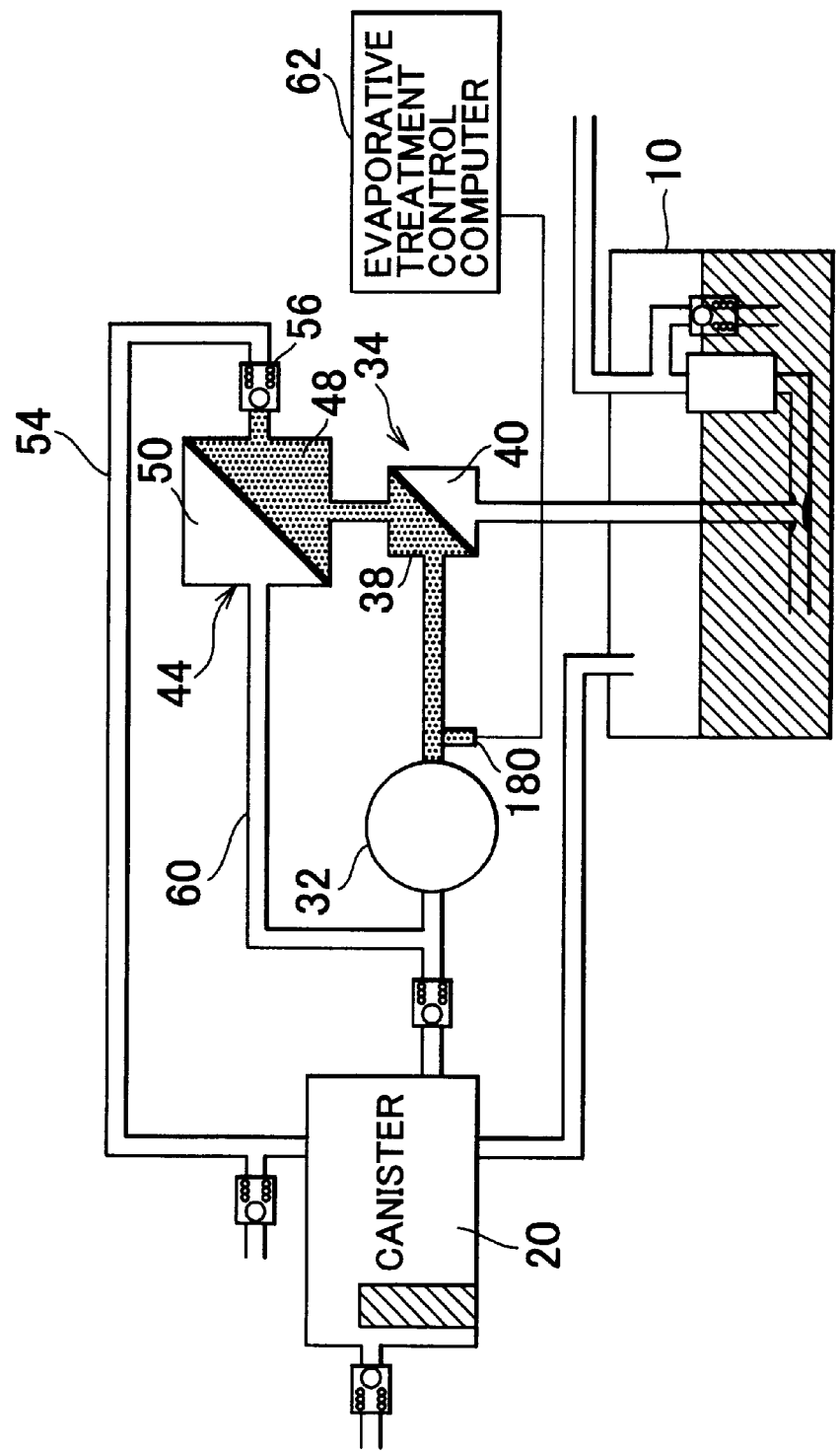
FIG. 16 is an explanatory view of the construction of an evaporative fuel treating device in accordance with a seventh embodiment of the invention.

FIG. 16 is an explanatory view of the construction of the evaporative fuel treating device in accordance with the seventh embodiment. In FIG. 16, components identical to those shown in FIG. 1 are denoted by the same reference symbols, and description thereof will be omitted or simplified.

As shown in FIG. 16, the device of the seventh embodiment has a pressure-detecting mechanism 180 in the vicinity of the discharge port of the purge gas circulation pump 32. For example, the pressure-detecting mechanism 180 can be realized by a known pressure sensor or a flow rate sensor utilizing a pitot tube disposed in a pipe line, a venturi, or the like.

The purge gas circulation pump 32 force-feeds evaporative fuel gas, whereby the device of the seventh embodiment makes it possible to treat evaporative fuel. Hence, in order for the device of the seventh embodiment to suitably exert the performance of treating evaporative fuel, it is necessary that the purge gas circulation pump 32 function normally.

As in the case of the first embodiment, the device of the seventh embodiment ensures desired treatment of evaporative fuel by increasing pressures applied to the first separating membrane 36 and the second separating membrane 46 by the pressure-regulating valve 56. Hence, in order for the device of the seventh embodiment to suitably exert the performance of treating evaporative fuel, it also is necessary that the pressure-regulating valve 56 function normally.

Furthermore, in the device of the seventh embodiment, if there is a leak in the path extending from the purge gas circulation pump 32 to the pressure-regulating valve 56, evaporative fuel flows out into the atmosphere from the leak, and exhaust emission properties of the vehicle are adversely affected.

Thus, in the device of the seventh embodiment, it is useful that an abnormality in the purge gas circulation pump 32, an abnormality in the pressure-regulating valve 56, and an abnormality of leakage in the path extending from the purge gas circulation pump 32 to the pressure-regulating valve 56 be detected without delay.

Figure 17:
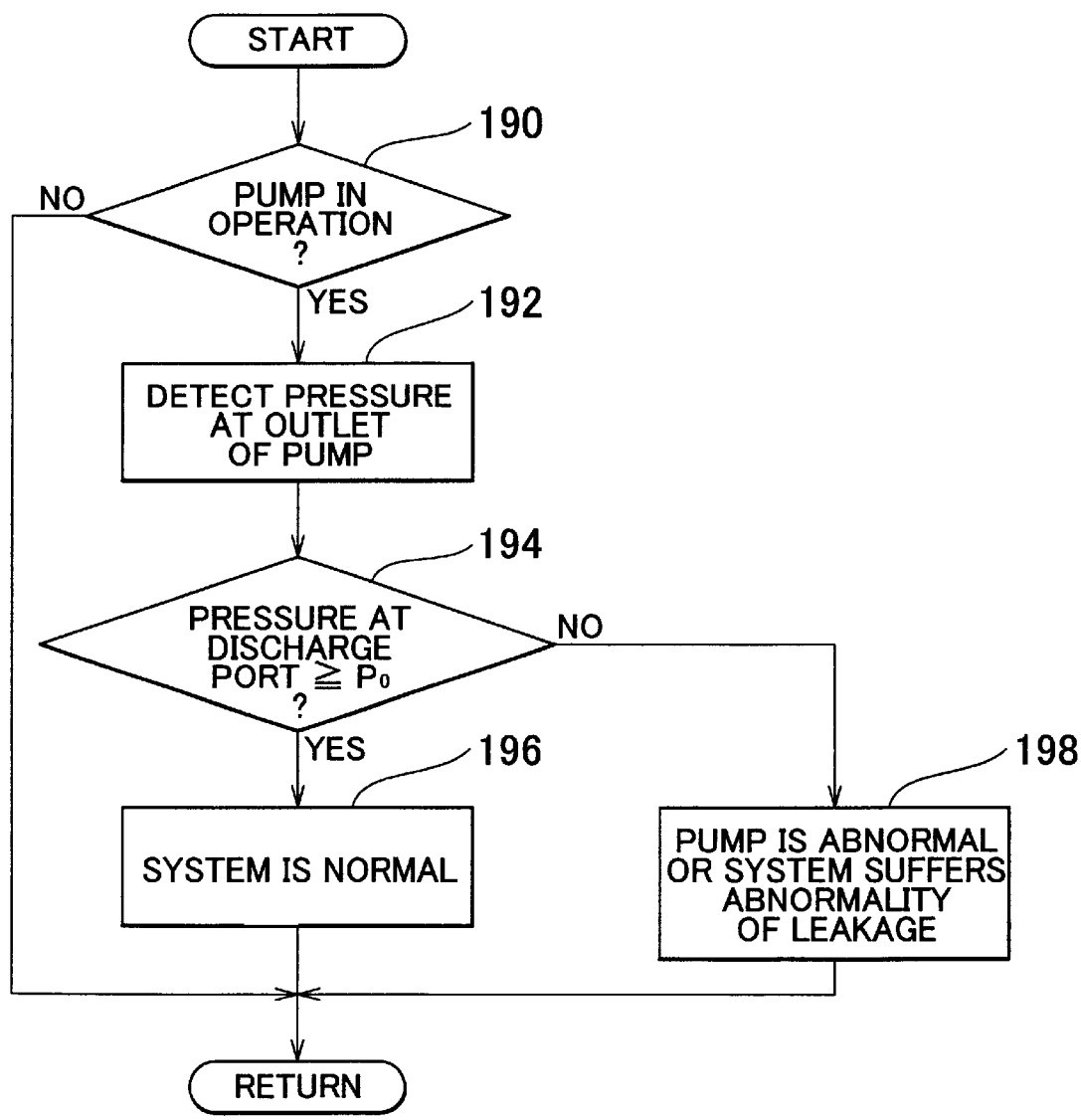
FIG. 17 is a flowchart of a first control routine that is executed in the device of the seventh embodiment.

FIG. 17 is the flowchart of a first routine that is executed by the ECU 62 so as to detect the above-mentioned abnormalities. In the routine shown in FIG. 17, it is first determined whether or not the purge gas circulation pump 32 is in operation (step 190). If it is determined as a result that the purge gas circulation pump 32 is not in operation, the present processing cycle is immediately terminated. On the other hand, if it is determined that the purge gas circulation pump 32 is in operation, a pressure at the discharge port of the pump 32 is then detected on the basis of an output from the pressure-detecting mechanism 180 (step 192).

If the pressure at the discharge port of the pump 32 is detected, it is then determined whether or not the pressure is equal to or higher than a predetermined criterion value $P_0$ (step 194). If the purge gas circulation pump 32 is not in suitable operation, the above-mentioned pressure at the discharge port is lower than a normal value. The pressure is also lower than the normal value if a malfunction of leakage occurs in the path extending from the pump 32 to the pressure-regulating valve 56 or if the pressure-regulating valve 56 remains open due to a malfunction. The criterion value $P_0$ used in the present step 194 is a value that has been set in advance on the basis of a normal pressure at the discharge port so as to determine whether or not those abnormalities exist.

In the routine shown in FIG. 17, if it is determined that the condition of the above-mentioned step 194 is fulfilled, it is determined that a system extending from the purge gas circulation pump 32 to the pressure-regulating valve 56 is normal (step 196). On the other hand, if it is determined that the condition of the above-mentioned step 194 is not fulfilled, it is determined that there is an abnormality in the system extending from the purge gas circulation pump 32 to the pressure-regulating valve 56 (step 198).

As described above, the routine shown in FIG. 17 makes it possible to accurately determine whether or not there is an abnormality in the purge gas circulation pump 32 or the pressure-regulating valve 56. Thus, according to the device of the seventh embodiment, if some abnormality has occurred in the system extending from the purge gas circulation pump 32 to the pressure-regulating valve 56, the abnormality can be detected without delay.

Figure 18:
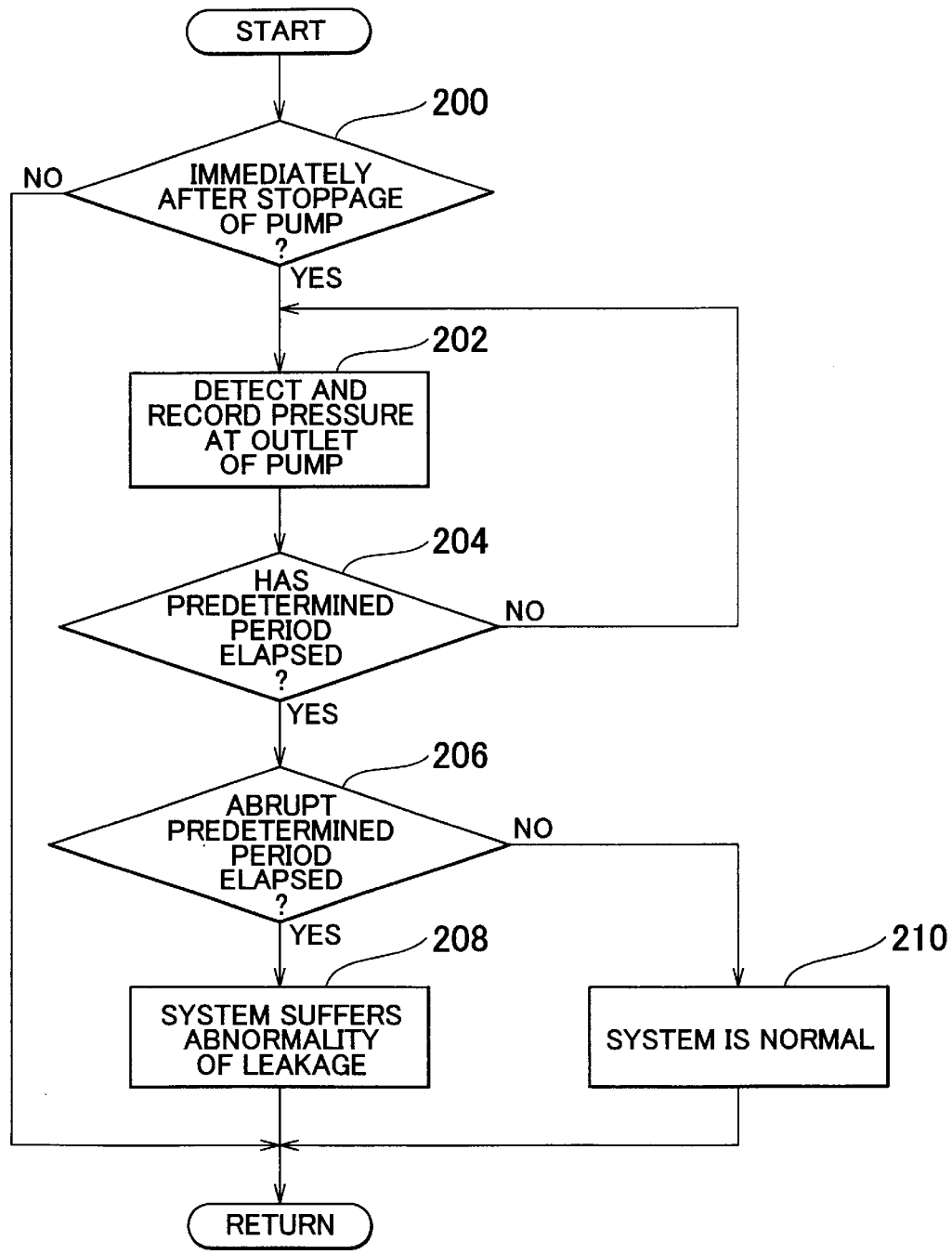
FIG. 18 is a flowchart of a second control routine that is executed in the device of the seventh embodiment.

FIG. 18 is a flowchart of a second routine that is executed by the ECU 62 so as to detect an abnormality in the device. In the routine shown in FIG. 18, it is first determined whether or not the present processing cycle was activated immediately after stoppage of the purge gas circulation pump 32 (step 200). If it is determined as a result that the present processing cycle was not activated immediately after stoppage of the pump 32, the present processing cycle is immediately terminated.

On the other hand, if it is determined that the condition of the above-mentioned step 200 is fulfilled, a pressure at the discharge port of the purge gas circulation pump 32 is detected on the basis of an output from the pressure-detecting mechanism 180, and is recorded (step 202). It is then determined whether or not a predetermined period has elapsed (step 204). The above-mentioned predetermined period represents a required period for determining how the pressure at the discharge port changes immediately after stoppage of the pump 32. The processings in the above-mentioned steps 202 and 204 are repeatedly performed until it is determined that the predetermined period has elapsed. On the other hand, if it is determined that the predetermined period has elapsed, it is then determined on the basis of changes in the recorded pressure at the discharge port whether or not the pressure has abruptly fallen (step 206).

If there is no abnormality of leakage in the path extending from the purge gas circulation pump 32 to the pressure-regulating valve 56, the pressure at the discharge port gently changes after stoppage of the pump 32. On the other hand, if there is an abnormality of leakage in the above-mentioned path, the pressure at the discharge port abruptly falls after stoppage of the pump 32. In the above-mentioned step 206, it is determined, on the basis of a predetermined criterion value, whether or not the pressure has fallen to the extent of making it possible to determine that there is an abnormality of leakage.

If it is determined that the pressure at the discharge port of the purge gas circulation pump 32 has abruptly fallen, it is determined that there is an abnormality of leakage in the system extending from the pump 32 to the pressure-regulating valve 56 (step 208). On the other hand, if it is determined that such an abrupt fall in the pressure has not occurred, it is determined that the system extending from the pump 32 to the pressure-regulating valve 56 is normal (step 210).

As described above, the routine shown in FIG. 18 makes it possible to determine, on the basis of changes in the pressure at the discharge port immediately after stoppage of the purge gas circulation pump 32, whether or not there is an abnormality of leakage in the system extending from the pump 32 to the pressure-regulating valve 56, namely, in a system to which a positive pressure is applied. Thus, the device of the seventh embodiment makes it possible to detect the occurrence of such an abnormality of leakage without delay and to prevent evaporative fuel from being discharged into the atmosphere.

In the above-mentioned seventh embodiment, the pressure-detecting mechanism 180 functions as a "pump outlet pressure detecting means." The ECU 62 executes the above-mentioned routine shown in FIG. 17 to function as an "abnormality recognizing means."

In the above-mentioned seventh embodiment, the pressure-detecting mechanism 180 also functions as a "pump outlet pressure detecting means." The ECU 62 performs the above-mentioned routine shown in FIG. 18 to function as a "leakage determining means."

Next, an eighth embodiment of the invention will be described with reference to FIGS. 19 and 20.

Figure 19:
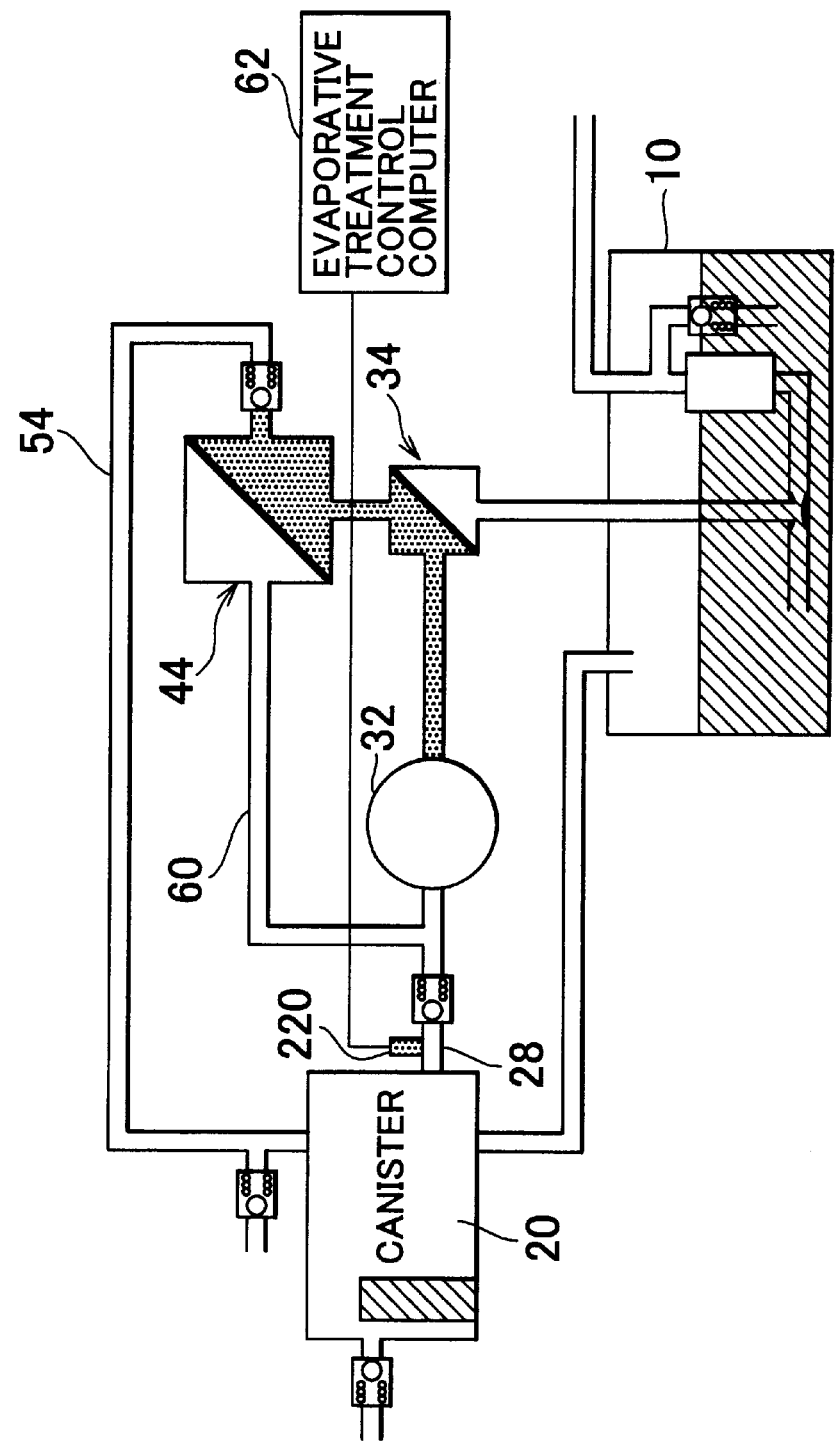
FIG. 19 is an explanatory view of the construction of an evaporative fuel treating device in accordance with an eighth embodiment of the invention.

FIG. 19 is an explanatory view of the construction of the evaporative fuel treating device in accordance with the eighth embodiment. In FIG. 19, components identical to those shown in FIG. 1 are denoted by the same reference symbols, and description thereof will be omitted or simplified.

As shown in FIG. 19, the device of the eighth embodiment has a flow rate sensor 220 for measuring an amount of canister outlet gas. The flow rate sensor 220 is disposed in the purge passage 28 and is realized as a sensor that has a known structure in which a pitot tube disposed in the purge passage 28, a venturi, or the like is utilized.

In the device of the eighth embodiment, as in the case of the first embodiment, the amount of circulating gas produced by the medium-concentration separation unit 44 increases in proportion to an increase in concentration of canister outlet gas. Because the performance of the purge gas circulation pump 32 is constant, the flow rate of canister outlet gas decreases in proportion to an increase in amount of circulating gas. Thus, the flow rate of canister outlet gas decreases in proportion to an increase in concentration of canister outlet gas, and is increased as the concentration of canister outlet gas decreases. Accordingly, the device of the eighth embodiment makes it possible to estimate a concentration of canister outlet gas, namely, an adsorption state of fuel in the canister 20 from a flow rate of canister outlet gas.

It is sufficient that purge of evaporative fuel be carried out under circumstances in which a large amount of fuel is adsorbed in the canister 20. There is no need to carry out purge under circumstances in which the amount of fuel adsorbed in the canister 20 is sufficiently small. Hence, if the amount of fuel adsorbed in the canister 20 has become sufficiently small after the start of purge of evaporative fuel, it is desirable that purge be completed immediately. Thus, the device of the eighth embodiment is designed such that a state of adsorption of fuel in the canister is estimated from a flow rate of canister outlet gas and that purge of evaporative fuel is completed if the amount of fuel adsorbed in the canister can be estimated to be sufficiently small.

Figure 20:
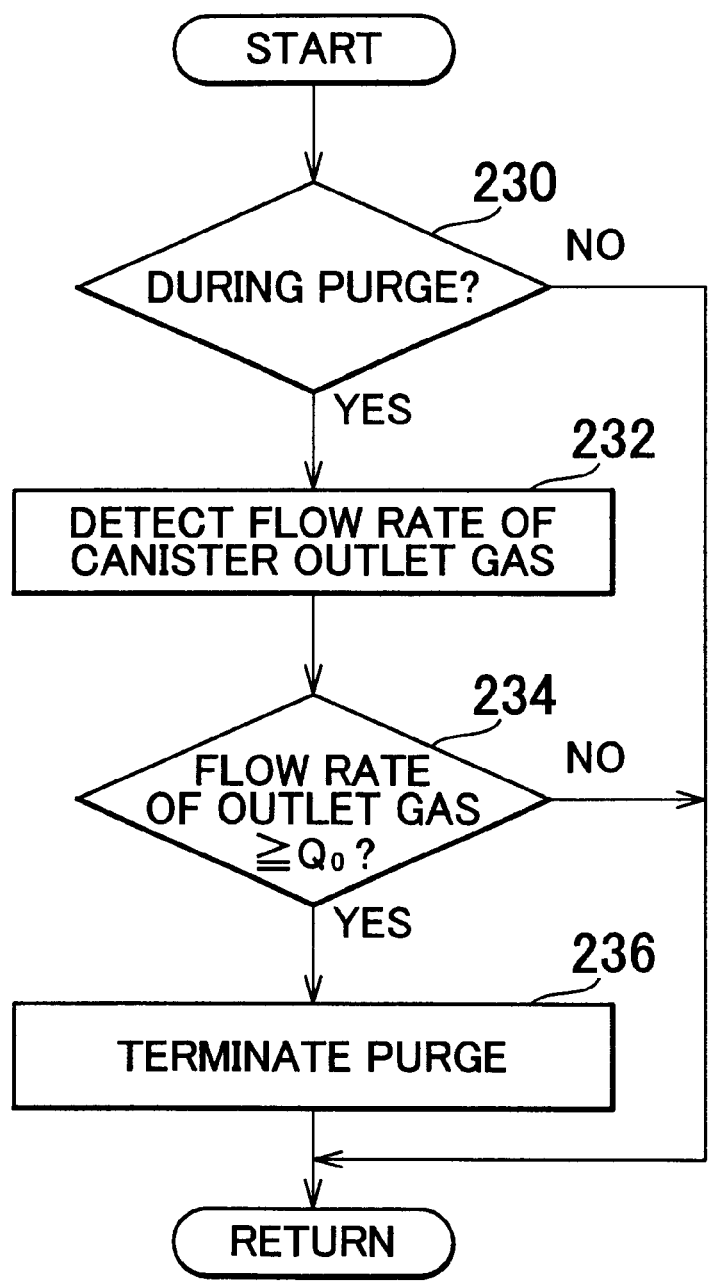
FIG. 20 is a flowchart of a control routine that is executed in the device of the eighth embodiment.

FIG. 20 is the flowchart of the control routine that is executed by the ECU 62 in the eighth embodiment so as to realize the above-mentioned function. In the routine shown in FIG. 20, it is first determined whether or not purge of evaporative fuel is being carried out, more specifically, whether or not the purge gas circulation pump 32 is in operation (step 230). If it is determined as a result that evaporative fuel is not being purged, the present processing cycle is immediately terminated. On the other hand, if it is determined that evaporative fuel is being purged, a flow rate of canister outlet gas is then detected on the basis of an output from the flow rate sensor 220 (step 232).

It is then determined whether or not the detected flow rate of canister outlet gas is equal to or higher than a predetermined criterion value $Q_0$ (234). The criterion value $Q_0$ represents a flow rate of canister outlet gas at the time when the concentration of canister outlet gas becomes equal to a concentration requiring purge to be terminated (e.g., 15%). Accordingly, if it is determined that the flow rate $Q_0$ is not equal to or higher than $Q_0$, it is possible to determine that the concentration of canister outlet gas has not fallen to the concentration requiring purge to be terminated. In this case, the present routine is immediately terminated without terminating purge afterwards.

On the other hand, if it is determined in the above-mentioned step 234 that the flow rate of canister outlet gas is equal to or higher than the criterion value $Q_0$, it is possible to determine that the concentration of canister outlet gas has fallen to the concentration requiring purge to be terminated. In this case, in the routine shown in FIG. 20, a processing for terminating purge, namely, a processing for stopping the purge gas circulation pump 32 or the like is then performed.

As described above, the device of the eighth embodiment makes it possible to terminate purge on the basis of a flow rate of canister outlet gas as soon as the concentration of canister outlet gas has suitably fallen, that is, as soon as the amount of evaporative fuel adsorbed in the canister 20 has become sufficiently small. Thus, the device of the eighth embodiment makes it possible to terminate purge at a suitable timing without employing a sensor for detecting a concentration of evaporative fuel gas.

In the above-mentioned eighth embodiment, since a state of adsorption of fuel in the canister 20 is reflected by a flow rate of canister outlet gas, a timing for completing purge is determined on the basis of the flow rate. However, this is not the only factor that can be used for determining a timing for completing purge. That is, a state of adsorption of fuel in the canister 20 is reflected not only by a flow rate of canister outlet gas but also by flow rates of treating gas, circulating gas, canister inlet gas, and the like. Accordingly, it is also preferable that a timing for completing purge be determined on the basis of flow rates of those gases.

In the above-mentioned eighth embodiment, the flow rate sensor 220 functions as a "canister flow gas detecting means." The ECU 62 performs the processing in the above-mentioned step 234 to function as a "purge completion determining means."

The controller (e.g., the ECU 62) of the illustrated exemplary embodiments is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An evaporative fuel treating device for an internal combustion engine, comprising:

a canister that adsorbs evaporative fuel generated in a fuel tank;

a purge pump coupled to the canister, and that causes canister outlet gas to flow out from the canister;

a separating unit that separates the canister outlet gas into treating gas containing a high concentration of evaporative fuel, circulating gas containing a medium concentration of evaporative fuel, and canister inlet gas containing a low concentration of evaporative fuel;

a treating gas passage that introduces the treating gas from the separating unit into the fuel tank;

a circulating gas passage that causes the circulating gas to circulate from the separating unit to a location upstream of the separating unit; and a canister inlet gas passage that causes the canister inlet gas to circulate from the separating unit to a location upstream of the canister.

2. The evaporative fuel treating device according to claim 1, wherein:

the purge pump includes a purge gas circulation pump that communicates with the canister;

the separating unit includes a high-concentration separation unit and a medium-concentration separation unit;

the high-concentration separation unit has a first separating membrane for separating gas containing evaporative fuel into high-concentration gas containing a high concentration of evaporative fuel and low-concentration gas containing a low concentration of evaporative fuel, and separates mixed gas composed of the canister outlet gas and the circulating gas into the treating gas and medium-concentration gas; and the medium-concentration separation unit is disposed downstream of the high-concentration separation unit, has a second separating membrane functioning in the same manner as the first separating membrane, and separates the medium-concentration gas into the circulating gas and the canister inlet gas.

3. The evaporative fuel treating device according to claim 2, wherein an area of the first separating membrane is smaller than an area of the second separating membrane.

4. The evaporative fuel treating device according to claim 3, wherein a ratio between the area of the first separating membrane and the area of the second separating membrane is set such that the treating gas and the canister inlet gas contain evaporative fuel having a concentration equal to or higher than 95% and evaporative fuel having a concentration equal to or lower than 5%, respectively, in the case where the canister outlet gas contains evaporative fuel having a concentration of 15%.

5. The evaporative fuel treating device according to claim 1, wherein:
the fuel tank includes a feed pump that feeds fuel in the fuel tank to the internal combustion engine; and
the treating gas passage introduces the treating gas into a fuel suction port of the feed pump.

6. The evaporative fuel treating device according to claim 5, further comprising:
a venturi for generating a negative pressure at the fuel suction port of the feed pump.

7. The evaporative fuel treating device according to claim 2, wherein:
the purge gas circulating pump is disposed between the canister and the high-concentration separation unit; and
the canister inlet gas passage is provided with a pressure-regulating valve that makes a pressure on a side of the medium-concentration separation unit higher than a pressure on a side of the canister.

8. The evaporative fuel treating device according to claim 7, wherein a treating performance of the separating unit is variable, and further comprising:
a controller that calculates a required amount of evaporative fuel to be treated, and controls the evaporative fuel treating device on the basis of the required treatment amount.

9. The evaporative fuel treating device according to claim 8, wherein:
the treating performance is made variable by varying a pressure of the mixed gas coming into contact with the first separating membrane and a pressure of the medium-concentration gas coming into contact with the second separating membrane variable; and
the controller increases the pressure in proportion to an increase in the required treatment amount.

10. The evaporative fuel treating device according to claim 9, wherein:
the pressure-regulating valve has a variably settable pressure; and
the controller increases the set pressure of the pressure-regulating valve in proportion to an increase in the required treatment amount.

11. The evaporative fuel treating device according to claim 9, wherein:
a discharging performance of the purge gas circulation pump is variable so as to vary the treating performance; and
the controller increases the discharging performance in proportion to an increase in the required treatment amount.

12. The evaporative fuel treating device according to claim 8, wherein:
the evaporative fuel treating device includes a canister heater that heats the canister; and
the controller increases an amount of heat to be generated by the canister heater in proportion to an increase in the required treatment amount.

13. The evaporative fuel treating device according to claim 7, further comprising:
a negative pressure adjusting valve that is disposed between the canister and the purge gas circulation pump and that generates a negative pressure in the circulating gas passage during operation of the purge gas circulation pump.

14. The evaporative fuel treating device according to claim 1, further comprising:
desorption promoting means that promotes desorption of evaporative fuel from the canister.

15. The evaporative fuel treating device according to claim 14, wherein the desorption promoting means includes canister heating means that heats the canister.

16. The evaporative fuel treating device according to claim 15, wherein:
the canister and the purge gas circulation pump are disposed such that heat resulting from operation of the purge gas circulation pump is transmitted to the canister; and
the canister heating means includes the purge gas circulation pump.

17. The evaporative fuel treating device according to claim 14, further comprising:
a concentration detector that detects at least one of a concentration of the canister outlet gas, a concentration of the mixed gas, and a concentration of the treating gas; and
a controller that determines, on the basis of a difference between a value detected by the concentration detector during operation of the desorption promoting means and a value detected by the concentration detector during stoppage of the desorption promoting means, whether or not the desorption promoting means is functioning abnormally.

18. The evaporative fuel treating device according to claim 2, wherein the high-concentration separation unit is disposed below the medium-concentration separation unit.

19. The evaporative fuel treating device according to claim 2, wherein the fuel tank is disposed below the high-concentration separation unit and the medium-concentration separation unit.

20. The evaporative fuel treating device according to claim 2, further comprising:
a concentration detector that detects at least one of a concentration of the canister outlet gas, a concentration of the mixed gas, and a concentration of the treating gas;
a ratio between an area of the first separating membrane and an area of the second separating membrane is variable; and
a controller that controls the area ratio on the basis of a value detected by the concentration detector.

21. The evaporative fuel treating device according to claim 20, wherein:
the high-concentration separation unit is provided with a plurality of treating chambers;
the first separating membrane includes a plurality of portions each of which separates a corresponding one of the treating chambers into a corresponding one of upper chambers and a corresponding one of lower chambers;

the treating chambers are arranged such that the upper chambers lead to one another in series and that all the lower chambers communicate with the treating gas passage;

the area ratio is made variable by including at least two passages for introducing the mixed gas into at least two of the upper chambers, respectively, and a valve mechanism that makes a ratio between amounts of the mixed gas flowing through the at least two passages variable; and the controller controls the valve mechanism on the basis of a value detected by the concentration detector.

22. The evaporative fuel treating device according to claim 1, further comprising:

a treating gas tank that communicates with the treating gas passage and that accumulates the treating gas; and a fuel gas supply that supplies the internal combustion engine with fuel comprised of the treating gas accumulated in the treating gas tank when the internal combustion engine is started.

23. The evaporative fuel treating device according to claim 7, further comprising:

a pump outlet pressure detector that detects a pressure applied to an outlet portion of the purge gas circulation pump; and a controller that recognizes the occurrence of an abnormality in the purge gas circulation pump or in a path extending from the purge gas circulation pump to the pressure-regulating valve if the pressure that is applied to the outlet portion and that has been detected under circumstances requiring the purge gas circulation pump to be operated is unequal to a predetermined value.

24. The evaporative fuel treating device according to claim 7, further comprising:

a pump outlet pressure detector that detects a pressure applied to the outlet portion of the purge gas circulation pump; and a controller that determines, on the basis of a pressure change that occurs in the outlet portion immediately after operation of the purge gas circulation pump has been stopped, whether or not leakage has been caused in the path extending from the purge gas circulation pump to the pressure-regulating valve.

25. The evaporative fuel treating device according to claim 1, further comprising:

a canister flow gas detector that detects a flow rate of gas flowing through the canister; and a controller that makes, on the basis of a flow rate of gas flowing through the canister, a determination on completion of operation of the purge pump.

26. An evaporative fuel treating device for an internal combustion engine, comprising:

a canister that adsorbs evaporative fuel generated in a fuel tank;

canister outlet gas producing means for causing canister outlet gas to flow out from the canister;

vapor concentrating means for separating the canister outlet gas into treating gas containing a high concentration of evaporative fuel, circulating gas containing a medium concentration of evaporative fuel, and canister inlet gas containing a low concentration of evaporative fuel;

a treating gas passage that introduces the treating gas from the vapor concentrating means into the fuel tank;

a circulating gas passage that causes the circulating gas to circulate to a location upstream of the vapor concentrating means; and a canister inlet gas passage that causes the canister inlet gas to circulate from the vapor concentrating means to a location upstream of the canister.

27. The evaporative fuel treating device according to claim 26, wherein:

the vapor concentrating means includes a high-concentration separation unit and a medium-concentration separation unit, the high-concentration separation unit has a first separating means for separating gas containing evaporative fuel into high-concentration gas containing a high concentration of evaporative fuel and low-concentration gas containing a low concentration of evaporative fuel and separates mixed gas composed of the canister outlet gas and the circulating gas into the treating gas and medium-concentration gas; and the medium-concentration separation unit is disposed downstream of the high-concentration separation unit, has a second separating means functioning in the same manner as the first separating means, and separates the medium-concentration gas into the circulating gas and the canister inlet gas.

28. The evaporative fuel treating device according to claim 27, further comprising:

variable treating performance means for making a treating performance at the time when the vapor concentrating means produces the treating gas variable;

required treatment amount acquiring means for calculating a required amount of evaporative fuel to be treated; and treating performance control means for controlling the variable treating performance means on the basis of the required treatment amount.

29. The evaporative fuel treating device according to claim 28, wherein:

the variable treating performance means includes variable pressure means for making a pressure of the mixed gas coming into contact with the first separating means and a pressure of the medium-concentration gas coming into contact with the second separating means variable; and the treating performance control means includes pressure control means for increasing the pressure in proportion to an increase in the required treatment amount.

30. The evaporative fuel treating device according to claim 29, wherein:

the variable pressure means includes variable pressure-regulating valve set pressure means for setting a pressure of the pressure-regulating valve located at an inlet passage of the canister; and the treating performance control means includes set pressure control means for increasing the pressure in proportion to an increase in the required treatment amount.

31. The evaporative fuel treating device according to claim 29, wherein:

the variable pressure means includes variable discharging performance means for making a discharging performance of the canister outlet gas producing means variable; and the treating performance control means includes discharging performance control means for increasing the discharging performance in proportion to an increase in the required treatment amount.

32. The evaporative fuel treating device according to claim 28, wherein:

the variable treating performance means includes canister heating means for heating the canister; and the treating performance control means includes heat generation amount control means for increasing an amount of heat to be generated by the canister heating means in proportion to an increase in the required treatment amount.

33. The evaporative fuel treating device according to claim 26, further comprising:

desorption promoting means for promoting desorption of evaporative fuel from the canister.

34. The evaporative fuel treating device according to claim 33, wherein the desorption promoting means includes canister heating means for heating the canister.

35. The evaporative fuel treating device according to claim 33, further comprising:

concentration detecting means for detecting at least one of a concentration of the canister outlet gas, a concentration of the mixed gas, and a concentration of the treating gas; and abnormality determining means for determining, on the basis of a difference between a value detected by the concentration detecting means during operation of the desorption promoting means and a value detected by the concentration detecting means during stoppage of the desorption promoting means, whether or not the desorption promoting means is abnormal.

36. A method for treating evaporative fuel for an internal combustion engine, in which a canister adsorbs evaporative fuel generated in a fuel tank, the method comprising:

causing canister outlet gas to flow out from the canister;

separating the canister outlet gas with a separating unit into treating gas containing a high concentration of evaporative fuel, circulating gas containing a medium concentration of evaporative fuel, and canister inlet gas containing a low concentration of evaporative fuel;

introducing the treating gas from the separating unit into the fuel tank;

causing the circulating gas to circulate from the separating unit to a location upstream of the separating unit; and causing the canister inlet gas to circulate from the separating unit to a location upstream of the canister.

37. The method according to claim 36, wherein:

the canister outlet gas is caused to flow out of the canister by a purge gas circulation pump that communicates with the canister; and the separating unit that separates the canister outlet gas performs a high-concentration separation and a medium-concentration separation, (i) the high-concentration separation uses a first separating membrane to separate gas containing evaporative fuel into high-concentration gas containing a high concentration of evaporative fuel and low-concentration gas containing a low concentration of evaporative fuel and separates mixed gas composed of the canister outlet gas and the circulating gas into the treating gas and medium-concentration gas, and (ii) the medium-concentration separation uses a second separating membrane functioning in the same manner as the first separating membrane and disposed downstream of the first separating membrane, and separates the medium-concentration gas into the circulating gas and the canister inlet gas.

38. The method according to claim 37, wherein an area of the first separating membrane is smaller than an area of the second separating membrane.

39. The method according to claim 38, further comprising setting a ratio between the area of the first separating membrane and the area of the second separating membrane such that the treating gas and the canister inlet gas contain evaporative fuel having a concentration equal to or higher than 95% and evaporative fuel having a concentration equal to or lower than 5% respectively in the case where canister outlet gas contains evaporative fuel having a concentration of 15%.

40. The method according to claim 36, further comprising:

introducing the treating gas into a fuel suction port of a feed pump that feeds fuel to the internal combustion engine.

41. The method according to claim 37, wherein:

the purge gas circulating pump is disposed between the canister and the first separating membrane; and the canister inlet gas passage is provided with a pressure-regulating valve that makes a pressure on the side of the second separating membrane higher than a pressure on the side of the canister.

42. The method according to claim 41, further comprising:

making a treating performance at the time when the separating unit produces the treating gas variable;

calculating a required amount of evaporative fuel to be treated; and controlling the treating performance on the basis of the required treatment amount.

43. The method according to claim 42, wherein:

the treating performance is varied by making a pressure of the mixed gas coming into contact with the first separating membrane and a pressure of the medium-concentration gas coming into contact with the second separating membrane variable, such that the pressure is increased in proportion to an increase in the required treatment amount.

44. The method according to claim 43, wherein the pressure is varied by controlling a variable pressure-regulating valve.

45. The method according to claim 43, wherein the pressure is varied by controlling a discharging performance of the purge gas circulation pump.

46. The method according to claim 42, wherein the treating performance is varied by controlling a canister heater that heats the canister.

47. The method according to claim 36, further comprising:

promoting desorption of evaporative fuel from the canister.

48. The method according to claim 47, wherein the desorption is promoted by heating the canister with a canister heater.

49. The method according to claim 48, wherein:

the canister and the purge gas circulation pump are disposed such that heat resulting from operation of the purge gas circulation pump is transmitted to the canister, and the canister heater includes the purge gas circulation pump.

50. The method according to claim 47, further comprising:
    detecting at least one of a concentration of the canister outlet gas, a concentration of the mixed gas, and a concentration of the treating gas; and
    determining, on the basis of a difference between a concentration value detected during the desorption promoting and a concentration value detected during stoppage of the desorption promoting, whether or not the desorption promoting is abnormal.

51. The method according to claim 37, further comprising disposing the high-concentration separation unit below the second separating membrane.

52. The method according to claim 37, further comprising disposing the fuel tank below the first and second separating membranes.

53. The method according to claim 37, further comprising:
    detecting at least one of a concentration of the canister outlet gas, a concentration of the mixed gas, and a concentration of the treating gas;
    making a ratio between an area of the first separating membrane and an area of the second separating membrane variable; and
    controlling the variable ratio on the basis of the detected concentration.

54. The method according to claim 36, further comprising:
    accumulating the treating gas in a treating gas tank that communicates with the treating gas passage, and supplying the internal combustion engine with the treating gas accumulated in a treating gas tank when the internal combustion engine is started.

55. The method according to claim 41, further comprising:
    detecting a pressure applied to an outlet portion of the purge gas circulation pump; and
    recognizing the occurrence of an abnormality in the purge gas circulation pump or in a path extending from the purge gas circulation pump to the pressure-regulating valve if the pressure that is applied to the outlet portion and that has been detected under circumstances requiring the purge gas circulation pump to be operated is unequal to a predetermined value.

56. The method according to claim 41, further comprising:
    detecting a pressure applied to the outlet portion of the purge gas circulation pump; and
    determining, on the basis of a pressure change that occurs in the outlet portion immediately after operation of the purge gas circulation pump has been stopped, whether or not leakage has been caused in the path extending from the purge gas circulation pump to the pressure-regulating valve.

* * * * *